(12) United States Patent
Hatsukaiwa et al.

(10) Patent No.: US 6,967,278 B2
(45) Date of Patent: Nov. 22, 2005

(54) SOLAR CELL MODULE AND ROOF EQUIPPED WITH POWER GENERATING FUNCTION USING THE SAME

(75) Inventors: Teruki Hatsukaiwa, Otsu (JP); Hirohiko Tomita, Kyoto (JP)

(73) Assignee: Kaneka Corporation, Osaka (JP)

(*) Notice: Subject to any disclaimer, the term of this patent is extended or adjusted under 35 U.S.C. 154(b) by 0 days.

(21) Appl. No.: 10/256,729

(22) Filed: Sep. 27, 2002

(65) Prior Publication Data

US 2003/0034064 A1   Feb. 20, 2003

Related U.S. Application Data

(63) Continuation of application No. PCT/JP01/02549, filed on Mar. 28, 2001.

(30) Foreign Application Priority Data

Mar. 28, 2000   (JP) .............................. 2000-089268
Jul. 11, 2000   (JP) .............................. 2000-210593

(51) Int. Cl.$^7$ .......................... H01L 31/04; E04D 3/40; E04D 13/18
(52) U.S. Cl. ...................... 136/251; 136/246; 136/259; 136/244; 136/291; 52/173.3; 257/433
(58) Field of Search ................................ 136/246, 251, 136/259, 244, 291; 52/173.3; 257/433

(56) References Cited

U.S. PATENT DOCUMENTS 4,936,063 A * 6/1990 Humphrey .................... 52/200
5,505,788 A * 4/1996 Dinwoodie ................. 136/246
5,746,839 A * 5/1998 Dinwoodie ................. 136/251
6,245,987 B1 * 6/2001 Shiomi et al. .............. 136/244

(Continued)

FOREIGN PATENT DOCUMENTS

EP   1270842 A1 * 1/2003

(Continued)

OTHER PUBLICATIONS

Machine English language translation of JP 10-190035 A, Jul. 1998.*

(Continued)

*Primary Examiner*—Alan Diamond
(74) *Attorney, Agent, or Firm*—Hogan & Hartson, LLP

(57) ABSTRACT

An object of the invention is to provide a solar cell module in which sufficient drainage and ventilation are ensured on the rear side, an output cable can be prevented from being caught during installation, and long term reliability is ensured by preventing bleed of the output cable, and another object of the invention is to provide a solar cell module integrated with building materials in which water leakage into the house and failure due to staying moisture can be avoided by imparting a waterproof function of a verge substrate water drip. A bottomed drain gutter opening to the abutting face of a heat insulating supporting material is provided to communicate with the side of the heat insulating supporting material, and a cable holding groove opening to the abutting face of a leg vertically provided on the heat insulating supporting material and deeper than the diameter of the laid cable is made to communicate with the side of the leg in order to hold the cable without projecting the cable from the opening. Furthermore, a plurality of geta members are arranged on the bottom of a supporting base and the thickness of each geta member is so set that the supporting base does not collapse the verge substrate water drip when the solar cell modules are laid on the verge substrate water drip.

37 Claims, 41 Drawing Sheets

U.S. PATENT DOCUMENTS

| | | | |
|---|---|---|---|
| 6,360,497 B1 * | 3/2002 | Nakazima et al. | 52/173.3 |
| 6,365,824 B1 * | 4/2002 | Nakazima et al. | 136/251 |
| 6,453,629 B1 * | 9/2002 | Nakazima et al. | 52/173.3 |
| 6,489,552 B2 * | 12/2002 | Yamawaki et al. | 136/251 |
| 2003/0184257 A1 * | 10/2003 | Nomura et al. | 320/101 |
| 2005/0005534 A1 * | 1/2005 | Nomura et al. | 52/90.2 |

FOREIGN PATENT DOCUMENTS

| | | | |
|---|---|---|---|
| JP | 7-302924 A | * | 11/1995 |
| JP | 08-270151 | | 10/1996 |
| JP | 10-054118 | | 2/1998 |
| JP | 10-131443 | | 5/1998 |
| JP | 10-131443 A | * | 5/1998 |
| JP | 10-190035 | | 7/1998 |
| JP | 10-190035 A | * | 7/1998 |
| JP | 10-292583 | | 11/1998 |
| JP | 10-317618 | | 12/1998 |
| JP | 11-001999 | | 1/1999 |
| JP | 11-081542 | | 3/1999 |
| JP | 2000-87522 A | * | 3/2000 |
| JP | 2000-114578 | | 4/2000 |
| JP | 2000-286440 | | 10/2000 |
| JP | 2000-336864 | | 12/2000 |
| JP | 2000-352154 A | * | 12/2000 |
| JP | 2001-173161 A | * | 6/2001 |
| JP | 2002-4525 A | * | 1/2002 |
| WO | WO-02/04761 A1 | * | 1/2002 |

OTHER PUBLICATIONS

Translation of paragraph 0024 of JP 10-190035 A, Jul. 1998.*

International Search Report and English Translation; International Preliminary Examination Report and English Translation dated Jun. 5, 2001.

Form PCT/IB/308; International Publication (front page); PCT Amendments and English Translation, dated Apr. 2, 2002.

* cited by examiner

INDOOR SIDE (a)

(b)

(a)

(b)

INDOOR SIDE (a)

(b)

(c)

(a)

(b)

(c)

(a)

(b)

(c)

SOLAR CELL MODULE AND ROOF EQUIPPED WITH POWER GENERATING FUNCTION USING THE SAME

CROSS REFERENCE TO RELATED APPLICATIONS

This application is a continuation of PCT Application No. PCT/JP01/02549, filed Mar. 28, 2001, which application was not published in English under PCT Article 21(2), and both the present application and the counterpart PCT application claim priority to Japanese Application Serial No. 2000-089268, filed Mar. 28, 2000, and Japanese Application Serial No. 2000-210593, filed Jul. 11, 2000.

TECHNICAL FIELD

The present invention relates to a solar cell module preferable for a solar power generation system and a roof equipped with a power generating function using the module, particularly to a solar cell module having an adiabatic support member contacting the surface of a roof body on the back of a solar cell and a roof equipped with a power generating function constituted by arranging the modules on a roof body.

BACKGROUND ART

A solar power generation system having been spread in recent years is constituted by a plurality of solar cell modules to be arranged on a roof of a house and the like. As shown in FIG. 39, for example, a system is generally used which supplies power to an indoor electric wiring by connecting many serial systems respectively constituted by connecting a predetermined number of solar cell modules 101, ... in series each other through backside output sections 104 of the modules 101 and connecting the solar cell modules located at leading and trailing ends of the serial connections to drawing cables 108, 108 extending to the inside of a house and supplying power to an indoor electric wiring through an indoor inverter in cooperation with a commercial power system.

As shown in FIG. 40, each solar cell modules 101 described for the above example is provided with a solar cell 105 constituting a roof material, a terminal box 142 constituting the output section 104 formed at the backside of the solar cell 105, and two output cables 141 and 141 extending from the terminal box 142 and having polarities different each other, in which each output cable 141 is connected to the output cable 141 of another module adjacent on a roof body 100 or the drawing cable 108.

Moreover, an adiabatic support member 102 contacting the surface of the roof body 100 is provided to the backside of the solar cell module 101. The adiabatic support member 102 shows not only the indoor adiabatic effect but also the buffering effect as a spacer between the solar cell 105 and roof body 100 and the annealing effect when using an amorphous-silicon solar cell. FIG. 40 shows a state before the solar cell module 101 is set on a roof, in which two output cables 141 and 141 extended from the terminal box 142 are temporarily set to a proper portion by a one-side adhesive tape 109 at the backside of a solar cell for the safety of management and execution. However, when setting the solar cell module 101 onto a roof, the output cables 141 are extended to the ridge and eaves sides respectively through the gap 103 between the adiabatic support members 102 and 102 and connected to predetermined cables as described above.

The solar cell module 101 is set on a roof by considering rain termination. However, because rainwater may enter the backside of the module when rain and wind are strong. Therefore, a substrate sheet 110 provided with a water-proof layer such as asphalt roofing is generally set onto the sheathing of the roof body 100 and each solar cell modules 101 is successively set on the sheet 110.

The rainwater entering the backside of a module is mainly discharged from the ridge side toward the eaves side through the gap 103 between the above adiabatic support members 102 and 102. However, rainwater is easily accumulated on the ridge-side wall portion 102a of the adiabatic support member orthogonal to the tilt direction of a roof or a contact face 102b with a roof body. Thereby, the problem of water leaked into the inside of a house occurs at the portion 102a or face 102b due to a long-times stay of the rainwater or stayed moisture may cause a failure of the solar cell module 101 because the air permeability of the backside of the module is not sufficiently maintained. If rainwater enters the backside of the module, it is important to quickly discharge the rainwater or moisture without staying the rainwater or moisture in the backside of the module.

Moreover, when setting the solar cell module 101 on a roof, the output cable 141 extended from the backside is connected to a predetermined cable through the gap 103 between the adiabatic support members 102 and 102 to fix the module to a roof body by small screws. In this case, however, a trouble may occur that the output cable 141 is held between the adiabatic support member 102 and roof body 100 and the trouble causes the execution efficient to deteriorate.

Furthermore, the output cables 141 and 141 connected through the gap 103 fix the solar cell module 101 and then, reach the substrate sheet 110 on a roof body along the longitudinal direction. However, when the output cable 141 having a waterproof coating layer made of a synthetic resin on the skin contacts the asphalt roofing or the like of the substrate sheet 110 for a long time, the coating layer may be melted due to a bleed produced on it in general.

Moreover, as described above, it is a matter of course that temporarily fixing the output cables 141 and 141 by the one-side adhesive tape 109 is not preferable in the manufacturing efficiency and cost and when setting the solar cell module 101, it is necessary to handle the removed adhesive tape 109 on a roof and this also causes the working efficiency to deteriorate.

Moreover, as shown in FIG. 41, an antiseptic adjustment material 10a and a verge-substrate dewatering eaves 19 extending to the central side of a roof body 10 along the outer face of a substrate sheet 18 are additionally disposed to both-side margin (verge) of a roof body to which the solar cell module 101 will be set from the ridge side to the eaves side and a bent portion 19a formed by bending the margin upward is formed the extended end at the central side. The rainwater incoming from the gap between the antiseptic adjustment material 10a and a not-illustrated solar cell module set adjacently to the material 10a is further prevented from entering the central side of the roof by the bent portion 19a and smoothly discharged toward the eaves side through a channel 19b formed on the verge-substrate dewatering eaves 19.

When setting the building-material-integrated solar cell module 101 provided with an original support table on a roof body, the solar cell module 101 to be set to the upside of the verge-substrate dewatering eaves 19 flatly crushes the bent portion 19a of the verge-substrate dewatering eaves 19 with pressure by the bottom 106a of the support table 106 at the both ends of the roof body 10 as shown in FIG. 42 and thereby the rainwater leaks to the central side of the roof from the crushed portion of the bent portion 19a. The leaked rainwater flows from the ridge side toward the eaves side through the gap between adiabatic support members provided to the backside of each solar cell module. However, the drainwater is easily accumulated on the ridge-side wall portion of the adiabatic support members orthogonal to the tilt direction of the roof or the contact face with the substrate sheet as described above. Thereby, the problem of water leaked into the inside of a house at the above portion or contact face due to a long-time stay of the rainwater or stayed moisture may cause a trouble of a solar cell module.

DISCLOSURE OF THE INVENTION

A solar cell module of the present invention comprises a solar cell constituting a roof material, an output cable extended from the backside of a solar cell, and an adiabatic support member fixed to the backside of the solar cell and contacting the surface of a roof body and is characterized in that a bottomed drain ditch opening at a contact face of the adiabatic support member with a roof body is formed so as to communicate with the side of the adiabatic support member.

In the case of the solar cell module, the rainwater and the like entering the backside is quickly discharged to the eaves side through the drain ditch without staying on the contact face with the wall portion of the eaves side or a roof body. Therefore, the problem of leaked water and the like are solved, the air permeability is improved through the drain ditch, and the moisture at the backside of the module is smoothly discharged.

Moreover, by inserting an output cable along the drain ditch, the skin of the cable is friction-secured to the inner wall of the drain ditch due to the repulsion of the cable bent due to insertion or the like and the cable is easily and securely temporarily fixed to the backside of a solar cell without separately using an adhesive tape or the like.

When forming a plurality of drain ditch so as to vertically and horizontally cross each other, the above drainage performance and air permeability are improved on the backside of a solar cell module. Moreover, in the case of temporary fixing of the output cable, by greatly bending the output cable at the confluence portion of the drain ditch vertically and horizontally and then inserting the cable, a sufficient repulsion of the cable in the straight direction is kept and a frictional force applied from the inner wall of the drain ditch is enhanced. Therefore, the cable is securely held by the inside of the drain ditch.

When setting the depth of the drain ditch to a value larger than the outside diameter of the output cable, the inserted output cable is completely housed in the ditch without protruding to the outside from the opening of the drain ditch. Therefore, the easiness of packing for shipping and the easiness of management that solar cell modules can be stably vertically stacked without damaging them are improved.

When forming the whole or a part of the drain ditch into a flared bottom shape, the inserted output cable is securely held by the inner wall tilting in the bottom direction of the drain ditch in the inside of the drain ditch.

When forming a constricted portion having width almost equal to the outside diameter of the cable on a part of the drain ditch along the longitudinal direction, the inserted output cable is held by the frictional force at the constricted portion and securely and stably held by the inside of the ditch.

In the case of a solar cell module in which an adiabatic support member is constituted by a flat body face-fixed to the backside of a solar cell and a plurality of legs independent each other and vertically disposed to the body of a roof from the flat body and the drain ditch is formed by gaps between these legs, and a cable-holding groove opening on the contact face to a roof body and having a depth larger than the diameter of the cable to hold an inserted cable while housing the cable without protruding from the opening is formed by communicating with the side of the legs, the indoor adiabatic effect and the annealing effect when using amorphous-silicon solar cells are sufficiently shown by the flat body face-fixed to backsides of solar cells and the buffering effect as a spacer between solar cells and the roof body is also sufficiently maintained by the flat body and the legs vertically set to the roof body side, and a drain ditch is inevitably formed between the legs. Therefore, the rainwater and the like entering the backside of a module are quickly discharged through the drain ditch without staying the wall of the ridge side or the contact face with a roof body, the problem of leaked water is solved, the air permeability is improved through the drain ditch, and moisture of the backside of the module is smoothly discharged. Moreover, by inserting the output cable between the legs, the skin of the cable is friction-secured by sidewalls of the legs by the repulsion of the bent cable or the like and it is possible to easily, securely, and temporarily fix the output cable to backsides of solar cells without separately using an adhesive tape or the like.

Moreover, by holding the output cable with the cable-holding groove, it is prevented that the output cable is held between the adiabatic support member and a roof body, the working efficiency for execution is improved, and the output cable after execution is kept while floated from the substrate sheet in the cable-holding groove. Therefore, bleed of the output cable is prevented and the reliability of the solar cell module is maintained for a long time.

In the case of a solar cell module in which an adiabatic support member is constituted by an elastic body and a cable-holding groove elastically holds an inserted cable with a portion having a width smaller than the cable diameter, the cable can be easily inserted into the cable-holding groove and the inserted cable is stably held by the small-width portion in the cable-holding groove even if an impact is applied when setting the solar cell module.

When a cable-holding groove is formed so as to be tapered from an opening toward the bottom, the operability for inserting a cable from the opening into the cable-holding groove is improved.

It is preferable that the cable-holding groove is constituted by one groove opening along a direction selected out of a longitudinal, transverse, diagonal, or moderate-curve directions or a combination of grooves.

When forming a wide housing space cut out by a heat ray in a cable-holding groove, it is possible to hold a one or more cables having various shapes and thicknesses.

When forming a cable-holding groove into a zigzag holding groove in its top view, an inserted cable is securely friction-held by the zigzag groove inner wall even if the holding groove has a large width and even a thin single cable can be stably held.

In the case of a solar cell module in which a cable-holding groove is at least provided to legs arranged nearby a position from which an output cable is extended to the outside of the module, the output cable extended so as to be connected to the output cable or incoming cable of another solar cell module adjacently disposed is stably held at the extending position. Therefore, it is possible to avoid an unexpected trouble that the output cable enters the backside again after the solar cell module is fixed and securely float the connector of the connected cable from a substrate sheet.

It is preferable to guide an output cable along the periphery of legs without forming a cable-holding groove on the legs arranged nearby the proximal end of the output cable.

It is preferable to use an adiabatic member made of expanded synthetic resin for the above adiabatic support member.

Moreover, in the case of a roof equipped with a power-generating function in which solar cell modules respectively constituted by holding an output cable with the above cable-holding groove along the outer face of a substrate sheet on the surface of a roof body, it is avoided that the output cable is held between adiabatic members, the working efficiency for execution is improved, and the output cable after execution is kept so as to be floated from the substrate sheet in the cable-holding groove as described above. Therefore, bleed of the output cable is prevented, and the liability is maintained for a long time and the power-generation capacity is stably maintained.

Particularly, in the case of a solar cell module provided with a support table for supporting the solar cell and fixing it to a roof body and formed into the building-material-integrated type in which a plurality of geta members (bulk-increase members) are disposed on the bottom of the support table facing the roof body and the thickness of each geta members is set so that the bent portion of verge-substrate dewatering eaves of the roof body is not crushed by the support table floated by these geta members when setting the solar cell module to the upper side of the verge-substrate dewatering eaves of the roof body, drainwater is smoothly discharged through the channel of the verge-substrate dewatering eaves without crushing the bent portion for stopping rainwater even when setting the solar cell module to the upper side of the verge-substrate dewatering eaves on the roof body.

The thickness of a geta member is set preferably to 4 to 5 mm by considering the height of the bent portion of general verge-substrate dewatering eaves.

When setting a geta member to a position for covering the opening of a screw hole drilled at the bottom of a support table, it functions as a waterproof sealing member to closely contact with the bottom of the support table, screw hole, and substrate sheet of a roof body and thereby, caulking of a fixed portion which has been necessary so far for execution can be omitted when fixing the geta member to the roof body together with the support table by screws or nails.

When forming a thick-wall portion on a geta member through a step and locating the opening of a screw hole to the thick-wall portion, the thick-wall portion is contact-bonded to a roof body when fixing the support table to the roof body and the waterproof sealing performance is further improved by increasing the face pressure of the portion.

It is preferable that a geta member is made of EPDM (ethylene-propylene-diene copolymer) or chloroprene and has a JISA hardness of 50 to 70.

It is preferable that the geta member is a contour-extrusion molded product.

Particularly, in the case of a building-material-integrated solar cell module successively disposed on a roof body by fitting an end of a solar cell to another support table already fixed onto the roof body when the front end of the bottom of each geta member in the fitting direction is smoothed, each geta member smoothly moves on a substrate sheet without deviating from a support table, the ridge-side end of the solar cell module is smoothly fitted to the above another support table, and the execution efficiency is prevented from lowering. In this case, it is preferable to attach a one-side adhesive tape whose surface is waxed to the front end of each geta member and attach the remaining portion to a support table.

In the case of a roof equipped with a power-generating function constituted by arranging solar cell modules in each of which the above geta member is disposed on the bottom of a support table on a roof body, the waterproof function of a verge-substrate dewatering eaves is maintained, leakage of water into the inside of a house and a trouble of a solar cell module due to stayed moisture are prevented and the power generation capacity and reliability are maintained for a long time.

Moreover, in the case of a solar cell module set on a roof body together with a roof tile, in which a solar cell is fixed to the right-receiving side of a substrate made of a non-combustible material, a tub structure is formed on the same side of the substrate as the tub portion of a roof tile and the substrate is fixed on the roof body by using an area of the substrate where no solar cell is fixed, it is possible to prevent a cable from being held also when arranging solar cell modules together with roof tiles and improve the operability.

In the case of a solar cell module in which a cover member is formed over the entire width-directional area of a solar cell fixed by a clamp is provided along the ridge-side margin of the solar cell, it is possible to prevent rainwater incoming from the eaves-side margin and a screw hole of the clamp.

In the case of a solar cell module in which a cover member is formed over the entire width-directional area of a solar cell fixed by a clamp is provided along the ridge-side margin of the solar cell, it is possible to prevent rainwater incoming from the eaves-side margin and a screw hole of the fixing member.

A solar cell module is preferable for execution and its waterproof performance is maintained in which a plurality of clamps for fixing a joint constituting the leg portion of the eaves side of the solar cell module are provided to the cover member and the module is connected onto a substrate through the cover member by engaging the joint with the clamp.

When attaching an elastic sealing member having a proper thickness of 3 mm or more to the back of a solar cell or potions located on the margin and inside of the back of the solar cell on the upper face of a substrate facing the back of the solar cell and forming a water-stop structure for the gap between the solar cell and the substrate by the sealing member, the gap between the solar cell and substrate is kept in an almost dry state.

When forming an opening for protruding a terminal box to the back of a module on a portion of a substrate facing the terminal box of the above solar cell and removably providing a tub member for covering the opening at the backside of the substrate, it is possible to discharge rainwater to the upper face of the ridge-side module even if the rainwater should enter from the opening.

It is preferable to provide a leg member to be secured to a roof-tile stand tree on a roof body to a substrate when fixing a solar cell module onto the roof body.

When constituting an adiabatic member by a flat body portion face-fixed to the backside of a solar cell and a plurality of legs independently each other and vertically set to the roof body side, providing a cable-holding groove to one or more legs, and moreover forming a cable-holding groove on the flat body portion on the extension line of the cable-holding grooves so as to communicate with the flat body portion, it is easy to vertically extend a held drawing cable or the like exceeding a roof-tile stand tree.

It is preferable to provide an earth member for grounding electrically connected to the substrate of solar cell modules adjacently arranged to right and left and a screw for electrical connection to the ridge-side end of the substrate.

It is preferable that the above solar cells are amorphous or hybrid.

Moreover, in the case of a roof equipped with a power-generating function constituted by arranging the above solar cell modules in each of which a tub structure is constituted together with roof tiles on a roof body, the solar cell modules respectively have characteristics as a roof-covering member superior in storm resistance and fire resistance and are lightly constituted. Moreover, an output cable is prevented from being held between adiabatic support members, the execution performance is improved and it is possible to easily replace the solar cell of only one purposed solar cell module without moving peripheral modules or roof tiles.

Moreover, the present invention provides a roof equipped with a power-generating function constituted by arranging the above solar cell modules along the surface of a roof body so that the power generated by the solar cell modules is introduced from the apex of the roof into the inside of a house through a cable, characterized in that a sleeve for guiding the cable to the inside of a house is provided to the apex of the roof and the sleeve has a cable entrance opening at the surface of the roof body on which solar cell modules are arranged and a cable exit opening at the surface or indoor side of another roof body adjacent to the former roof body using the ridge portion of the roof as a boundary nearby a portion where an insertion hole communicating with the inside of a house is formed.

In the case of the above roof equipped with a power-generating function, it is possible to smoothly extend the cable guided by the sleeve on the roof with no resistance. Moreover, because the cable exit introduced into the indoor side opens on the surface or indoor side nearby an insertion hole formed on another roof body, that is, on the roof body at the back of a conventional roof member where no solar cell module is set, water leakage from the sleeve setting portion is effectively prevented.

BEST MODE FOR CARRYING OUT THE INVENTION

Figure 1:
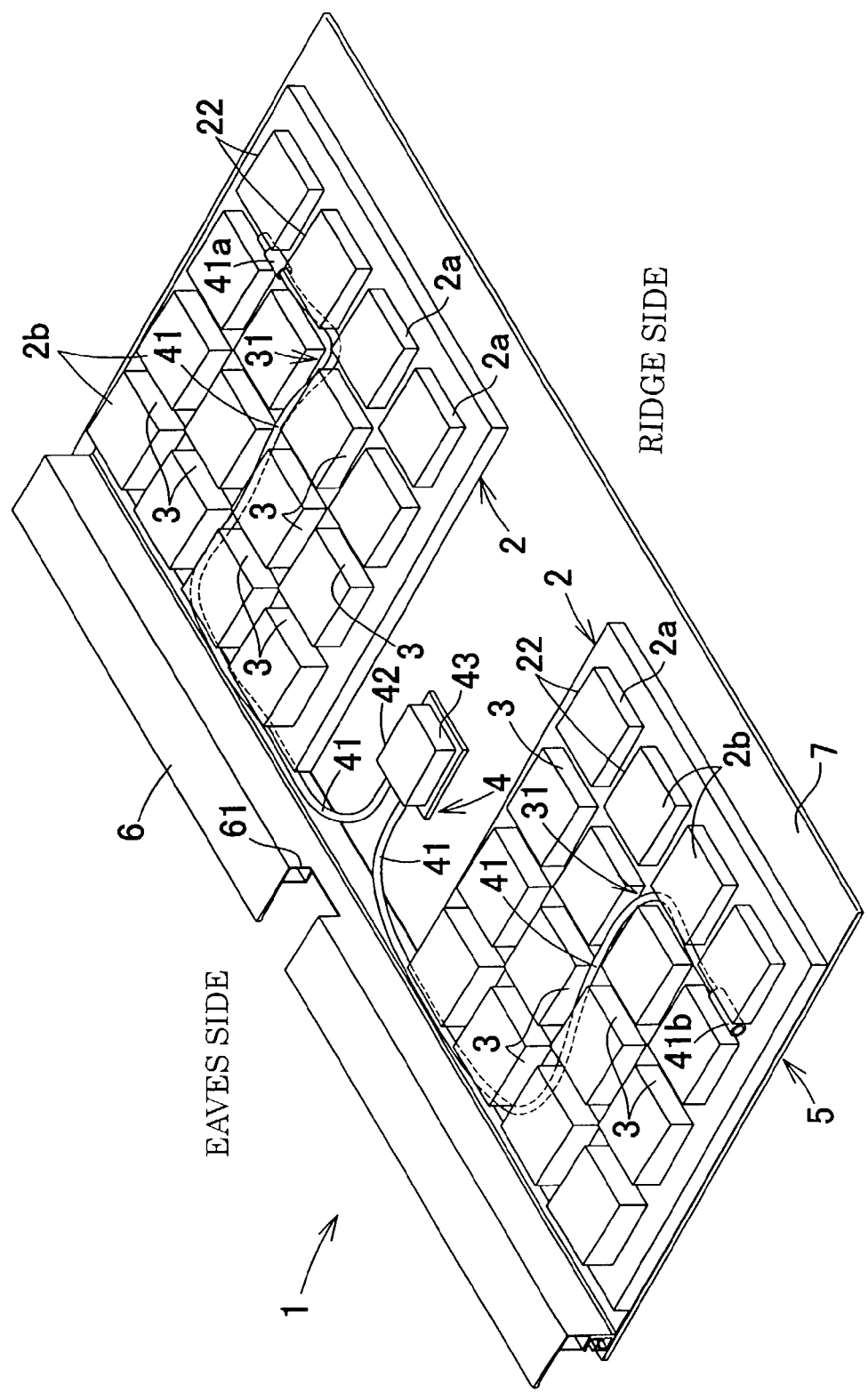
FIG. 1 is a backside perspective view showing a solar cell module of first embodiment provided with a drain ditch so as to communicate with the side of an adiabatic support member.
Figure 12:
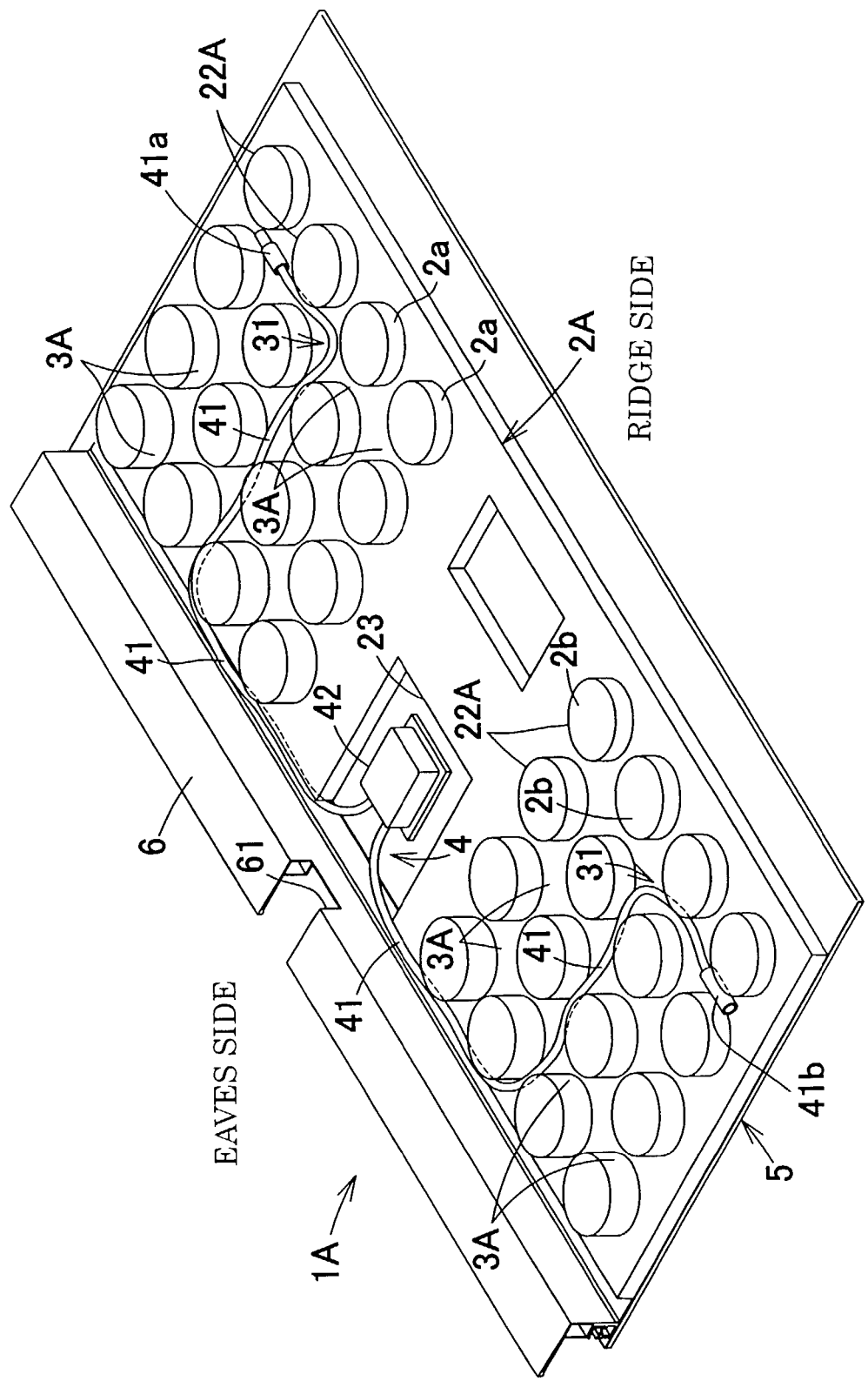
FIG. 12 is a backside perspective view showing a solar cell module of second embodiment in which an adiabatic support member provided to a drain ditch is integrally formed at the both sides of a terminal box.

Then, embodiments of the present invention are described below by referring to the accompanying drawings. FIG. 1 shows a backside configuration of the solar cell module 1 of the first embodiment, FIGS. 1 to 11 show the first embodiment of the present invention, FIG. 12 shows the second embodiment, FIGS. 13 to 18 show the third embodiment of the present invention, FIG. 19 shows the fourth embodiment, FIGS. 20 to 26 show the fifth embodiment, and FIGS. 27 to 38 show the sixth embodiment, in which symbol 1 denotes a solar cell module, 2 denotes an adiabatic support member, and 5 denotes a solar cell.

The solar cell module 1 is provided with the solar cell 5 constituting a roof member, an output cable 41 extended from the backside of the solar cell, and a pair of adiabatic support members 2 and 2 fixed on the backside of the solar cell 5, contacting the surface of a roof body, in which a bottomed drain ditch 3 opening on a contact face 2b with the roof body is formed on each adiabatic support member 2 so as to communicate with the side of the adiabatic support member. The adiabatic support member 2 is conventionally provided to obtain the indoor adiabatic effect or the buffering effect of a spacer between the solar cell 5 and the roof body. However, the present invention is constituted so as to prevent a problem of water leakage or the like and smoothly discharge moisture while keeping a sufficient air permeability at the backside of the solar cell module 1 by forming the above drain ditch 3 on the adiabatic support member 2 and thereby quickly discharging the rainwater or the like entering the backside of the solar cell module 1. Moreover, by inserting the output cable 41 along the drain ditch 3, it is possible to temporarily fix the output cable 41 simply and securely without using an adhesive tape or the like.

To fix the solar cell module 1 onto a roof body, it is possible to use proper fixing means such as means for using a frame previously set on a roof body the same as ever or means for setting an individual support table 6 every solar cell module like the case of this embodiment. Moreover, as the solar cell 5 constituting a roof member, it is possible to use any one of various photoelectric-conversion devices such as a single-crystal solar cell, polysilicon solar cell, amorphous-silicon solar cell, compound-semiconductor solar cell, and organic-semiconductor solar cell. Moreover, as the shape of the solar cell 5, it is possible to use a proper shape such as a rectangle or other quadrate or polygon in accordance with the shape of a roof body or the whole design.

<First Embodiment in which Drain Ditch is Formed so as to Communicate with Adiabatic Support Member>

In the case of the solar cell module 1 of this embodiment, an output section 4 is constituted by disposing a metallic plate 7 such as a galvanism steel plate on almost the entire back face of the solar cell 5 except the portion on which a terminal box 42 is set and setting the terminal box 42 from which two output cables 41 having polarities different from each other are extended to almost the center of the backside of the solar cell 5. The adiabatic support members 2 and 2 are fixed to the both sides of the terminal box 42 on the back of the metallic plate 7. Moreover, the support table 6 on whose central portion an insertion groove 61 into which an output cable and power cable are inserted is formed is provided to the eaves-side end of the back of the metallic plate 7 and thereby, a roof member which can be directly independently disposed on a roof body is constituted.

In the case of the solar cell 5, a thin-film-based solar cell is constituted by constituting a solar cell device in which a transparent electrode layer made of tin oxide or the like, optical semiconductor layer, and back electrode layer made of a metal or the like are formed in order on the back of a horizontally-rectangular glass substrate having a size of approx. 450×900 mm located on the surface and patterned by a laser beam and thereby a power-generating section and a wiring section and thereafter sealing and protecting the device-forming side with a filler such as EVA (ethylene-vinyl-acetate copolymer) or a Tedler film. The optical semiconductor layer uses a semiconductor layer obtained by synthesizing the amorphous or crystallite of an amorphous-silicon-based semiconductor made of any one of not only amorphous silicon a-Si, hydrogenated amorphous silicon a-Si: H, hydrogenated amorphous silicon carbide a-SiC: H, and amorphous silicon nitride but also an alloy made of other element such as silicon and carbon, germanium, or tin into the pin type, nip type, ni type, pn type, MIS type, heterojunction type, homojunction type, Schottky-barrier type, or a type obtained by combining the above types.

The terminal box 42 constituting the output section 4 has two relay terminals for relaying data between the output cables 41 and 41 in a housing for housing a not-illustrated output-fetching electrode member protruding to the back of the solar cell 5, a bypass diode is connected between the relay terminals, and a bypass circuit is formed which prevents a backward directional current from circulating through the module when some of cells of the solar cell 5 are shaded or at nighttime. The output cables 41 and 41 respectively have a waterproof covering layer made of a synthetic resin on the skin and are respectively extended to the outside of the eaves-side wall portion of a housing 43 fixed to the backside of the solar cell 5, and waterproof connectors 41a and 41b having a waterproof converting layer including a plug or socket are provided to front ends of the output cables 41 and 41 respectively.

The adiabatic support members 2 and 2 fixed to the metallic plate 7 at the backside of the solar cell 5 are respectively integrally-molded by a foam or the like and a plurality of drain ditches 3, . . . are formed on the backside contacting a roof body by vertically and horizontally crossing each other. The foam can use a homopolymer of styrene, propylene, ethylene, or urethane or a copolymer mainly containing the styrene, propylene, ethylene, and urethane, or a foam made of a mixture of the homopolymer or copolymer. Particularly, a foam made of the homopolymer of styrene, propylene, or ethylene or a copolymer mainly containing styrene, propylene, and ethylene is preferable and a foam made of a homopolymer of styrene, propylene, or ethylene is particularly preferable. The depth of the drain ditch 3 is set to a value at least larger than the outside diameter of the output cable 41 and the ditch width of it is set to a value between 15 and 60 mm, preferably between 25 and 35 mm.

Each adiabatic support member 2 is fixed at a strength at which the member 2 can be easily removed by human power at the backside of a solar cell and constituted so that a solar cell module can be easily removed from a roof body because the adiabatic support members 2 are easily removed. For example, to fix an adiabatic support member having a junction area of 0.3 m$^2$ to the backside of a solar cell, it is preferable that the member is joined by using an adhesive so that it can be easily removed from the backside of the solar cell at a removing force of approx. 5 kg.

Moreover, the two output cables 41 and 41 to be extended to the eaves side from the housing 43 of the terminal box after the solar cell module 1 is assembled are inserted into the adiabatic support members 2 along the vertical and horizontal drain ditches 3 while greatly bending vertically and horizontally at a midway confluence portion 31 from the eaves-side sidewall of each adiabatic support member 2 as illustrated. Each output cable 41 thus inserted into the drain ditch 3 is securely friction-held by the inner wall of the drain ditch 3 in accordance with the repulsion of the output cable 41 in the straight direction and temporarily removably fixed in the drain ditch 3 until the solar cell module 1 is set on the roof body.

Figure 2:
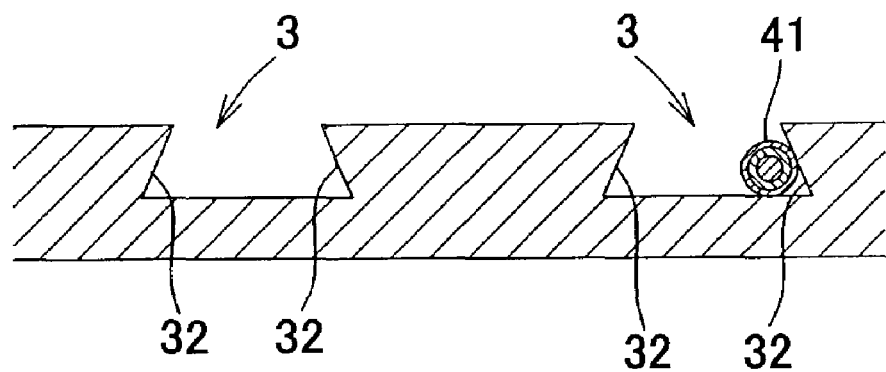
FIG. 2 is a sectional view showing a modification in which a drain ditch is formed into a bottom-flared shape.
Figure 3:
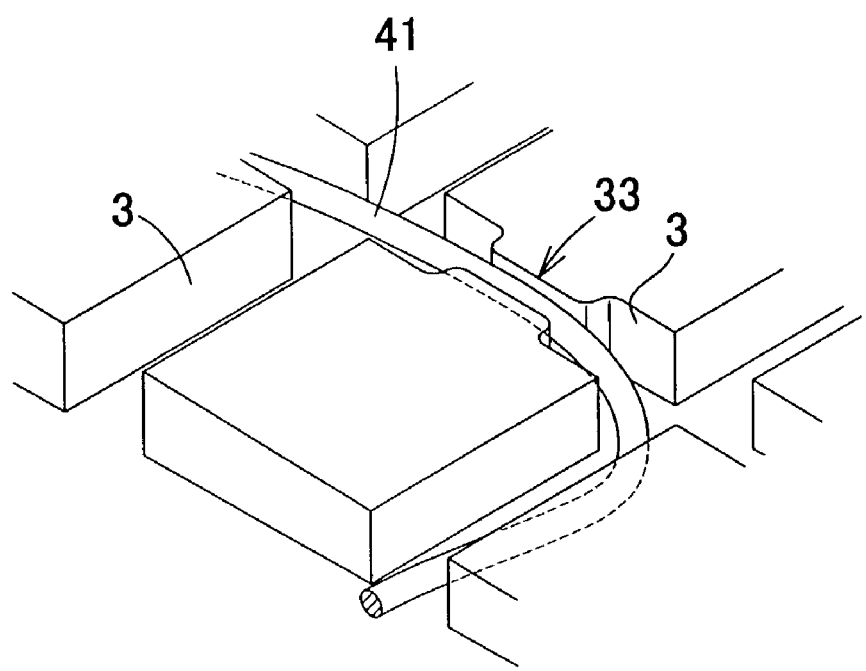
FIG. 3 is a perspective view showing a modification in which a constricted portion is formed on a drain ditch.
Figure 4:
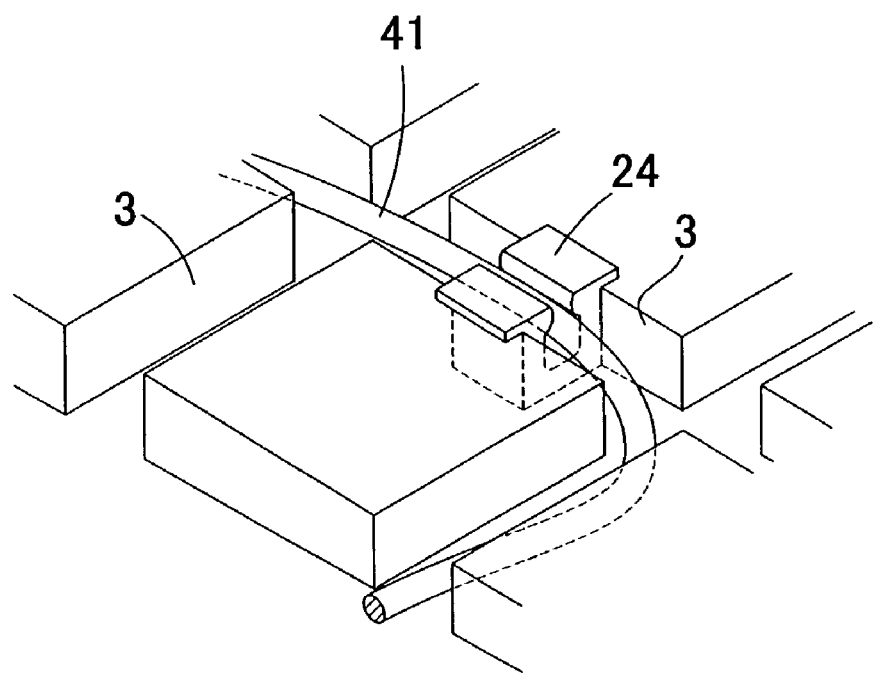
FIG. 4 is a perspective view showing a modification in which a securing member is fitted or bonded to a drain ditch.

To temporarily fix the output cable 41, it is preferable to form a part or the whole of the drain ditch 3 like a bottom-flared shape as shown in FIG. 2 because the inserted cable 41 can be further securely held by an inner wall 32 tilted in the bottom direction of the drain ditch 3. Moreover, as shown in FIG. 3, it is preferable to form a constricted portion 33 having a width almost equal to the outside diameter of the output cable 41 on a part of the drain ditch 3 along its longitudinal direction because the inserted output cable 41 is held by the frictional force at the constricted portion 33 and thereby, it can be securely and stably held by the ditch inside. Moreover, as shown in FIG. 4, it is preferable to fit or bond a securing member 24 having a large friction coefficient such as rubber along the internal shape of the drain ditch 3 to a portion of the drain ditch 3 to which the output cable 41 will be set because dimensions of the drain ditch 3 can be more freely set.

Figure 5:
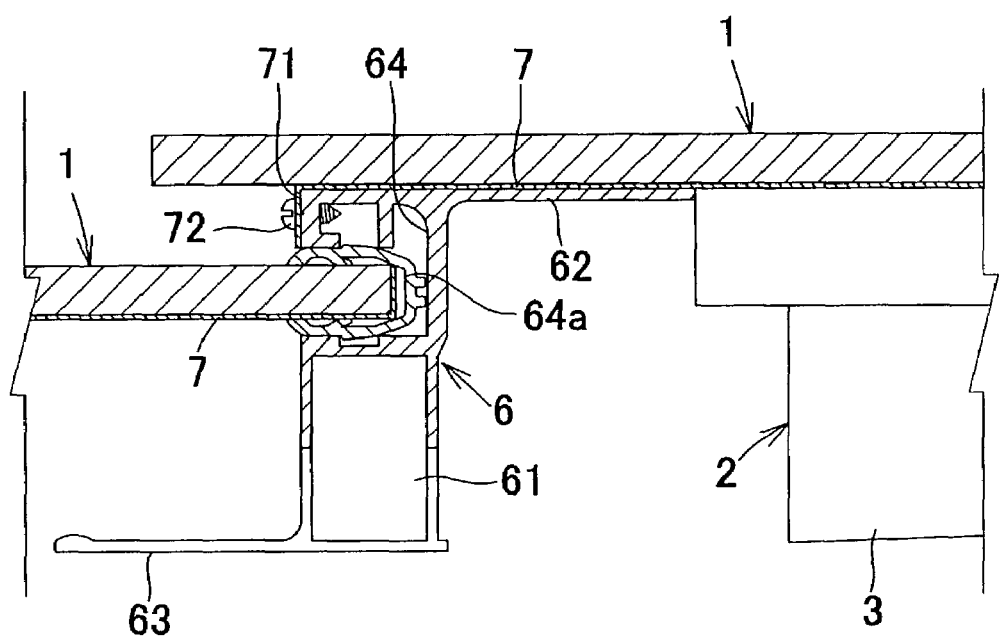
FIG. 5 is a sectional view showing a support table of a solar cell module.

The support table 6 for directly setting the solar cell module 1 onto a roof body is made of aluminum and as shown in FIG. 5, an inward flange 62 reaching the back of the metallic plate 7 is formed on the support table 6 so as to protrude in the width direction of, that is, the longitudinal direction of the solar cell module 1 and a tapped hole opening outward is formed on the support table 6 corresponding to a not-illustrated through-hole for a setscrew 72 drilled on a bent portion 71 formed by bending the eaves-side end of the metallic plate 7 downward. A setting groove 64 is formed on the upper-stage middle portion, which receives and engages with the eaves-side end of the adjacent solar cell module 1 opening outward along the longitudinal direction together with the metallic plate 7 and a waterproof gasket 64a, the insertion groove 61 into which an output cable and power cable are inserted is formed at the central portion of the bottom of the support table 6, and an outward flange 63 fixed to the roof body by screws or nails is formed on the bottom so as to protrude along the longitudinal direction.

Figure 6:
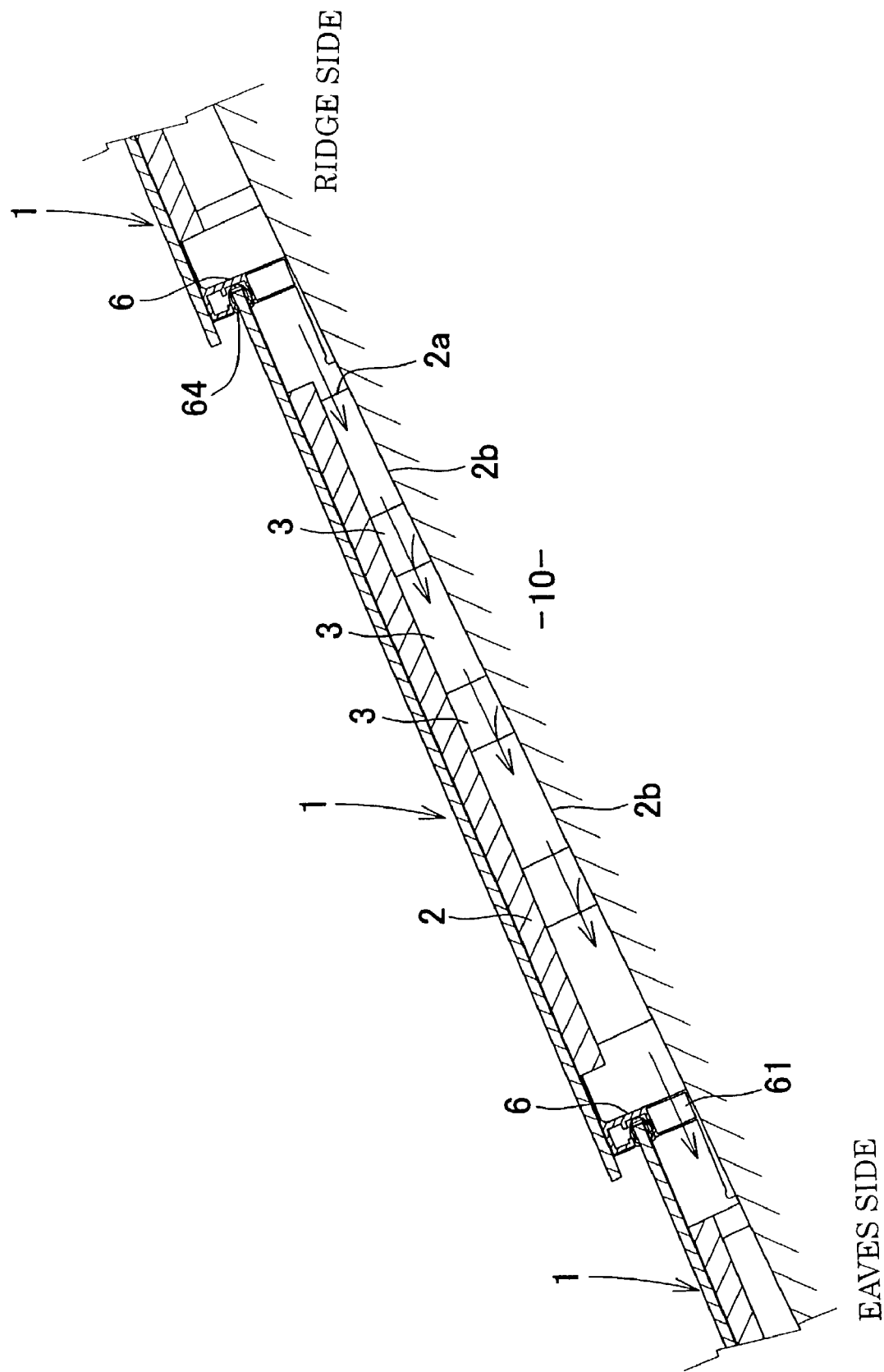
FIG. 6 is an illustration showing a state in which rainwater is discharged at the backside of a solar cell module.

When setting each solar cell module 1 onto a roof body, the output cable 41 temporarily fixed to the drain ditch 3 is taken out, and is connected through the insertion groove 61 to the output section or a drawing cable of adjacent another module by the waterproof connectors 41a and 41b through the insertion groove 61, and as shown in FIG. 6, the ridge-side end is supported by the setting groove 64 of the support table 6 already adjacently fixed to the upper portion of the roof and the eaves-side end is supported by the support table 6 fixed to the backside, and thereby the solar cell modules 1 are successively arranged to the lower portion of the roof while the adiabatic support member 2 provided to the backside contacts the surface of the roof body 10.

In this case, the above drawing cable is conventionally introduced into the indoor side through an insertion hole formed on the apex of the roof body at the ridge side. However, when extending the drawing cable from the insertion-hole up to a predetermined position on the roof body along the surface of the roof body, problems occur that the surface of the cable directly contacts the acute-angle opening margin of the insertion hole and thereby the skin covered so as to be waterproof is damaged or the safety or working efficiency is deteriorated because the resistance when extending the cable increases. Therefore, the present applicant finds that it is possible to smoothly extend the drawing cable 8 guided into the separately-prepared wiring sleeve 12 shown in FIGS. 7 and 8 by setting the sleeve 12 to the insertion-hole 11 and newly uses the wiring sleeve 12 for the wiring structure of this embodiment. Moreover, the applicable range of the wiring sleeve is not restricted to the wiring structure of a solar cell module of the present invention in which a drain ditch is formed on an adiabatic support member but the wiring sleeve can be also preferably applied to the wiring structure of a solar cell module having no drain ditch or cable-holding groove.

Figure 8:
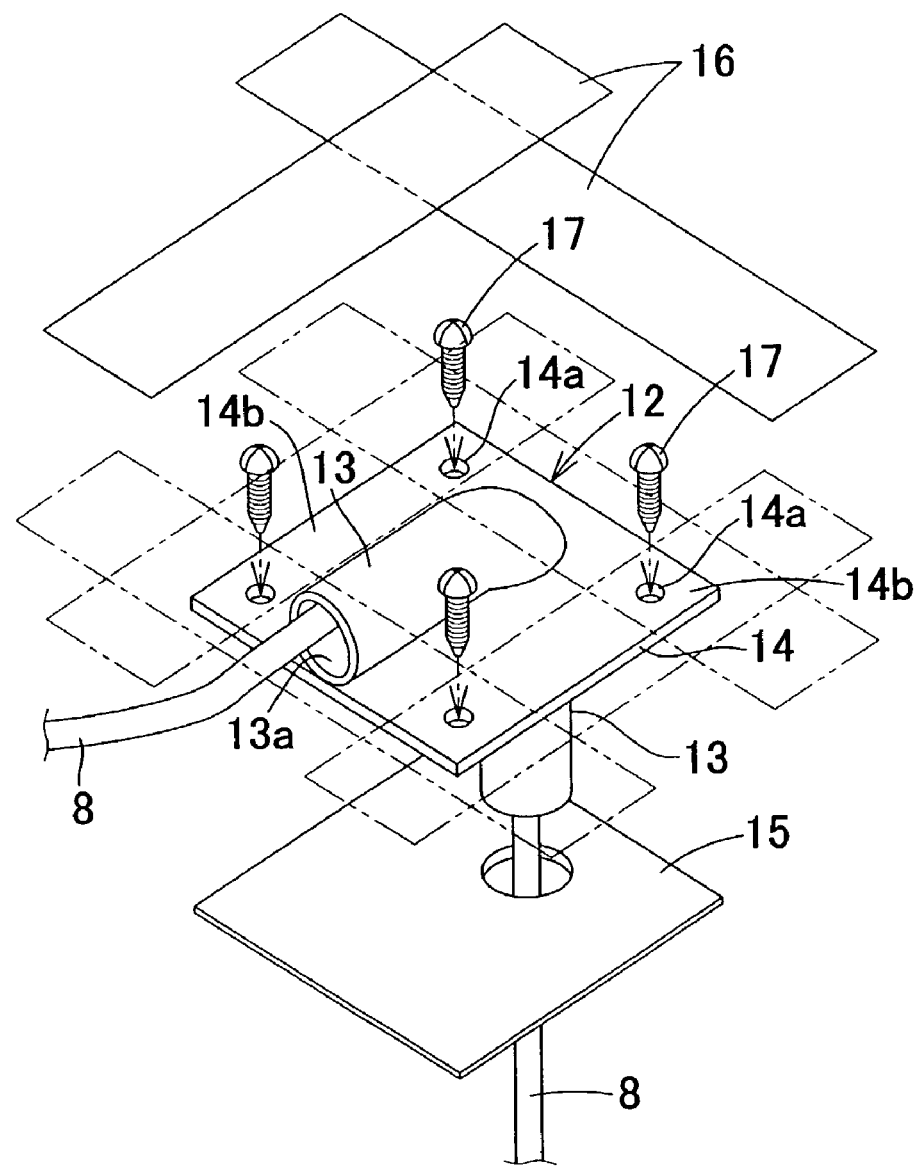
FIG. 8 is a perspective view showing a wiring sleeve.

As shown in FIG. 8, the wiring sleeve 12 is constituted by a cylindrical guide member 13 bent by approx. 90° in which a portion inserted into the insertion-hole 11 and extending to an indoor space and a portion along the surface of the roof body 10 are continued and a flat flange member 14 protruded from the cylindrical guide member 13 along the surface of the roof body. When setting the wiring sleeve 12 to the insertion-hole 11, the wiring sleeve 12 is fixed on the surface of the roof body 10 by a setscrew 17 inserted into the through-hole 14a protruding on the margin of the flange member 14. To prevent water from leaking into the indoor side, it is preferable to closely contact the back of the flange member 14 and the surface of the roof each other through a both-side adhesive tape 15 and moreover, it is preferable to seal an opening 13a of the cylindrical guide member 13 on the roof and a flange-member peripheral portion 14b including the setscrew 17 by a one-side adhesive tape 16.

Figure 9:
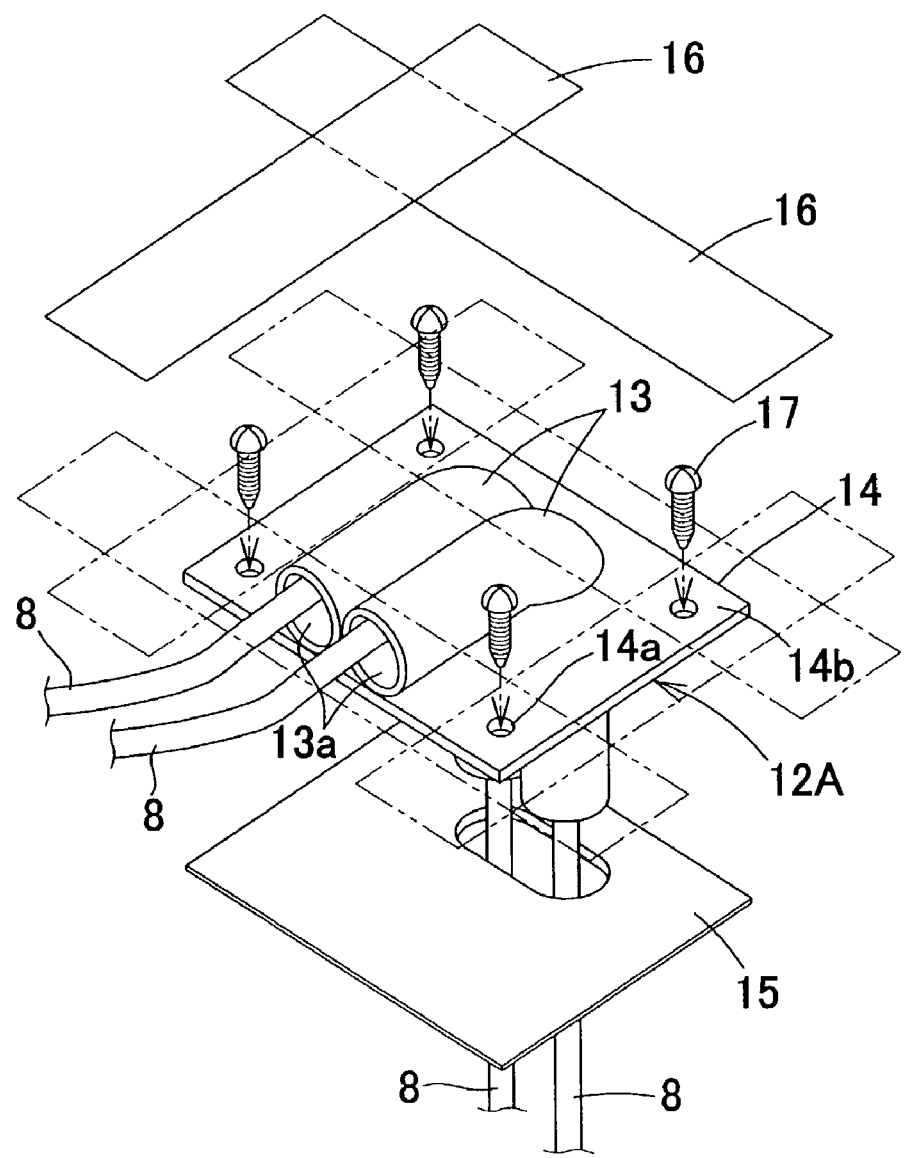
FIG. 9 is an example of a modification in which a plurality of cylindrical guiding members are arranged.
Figure 10:
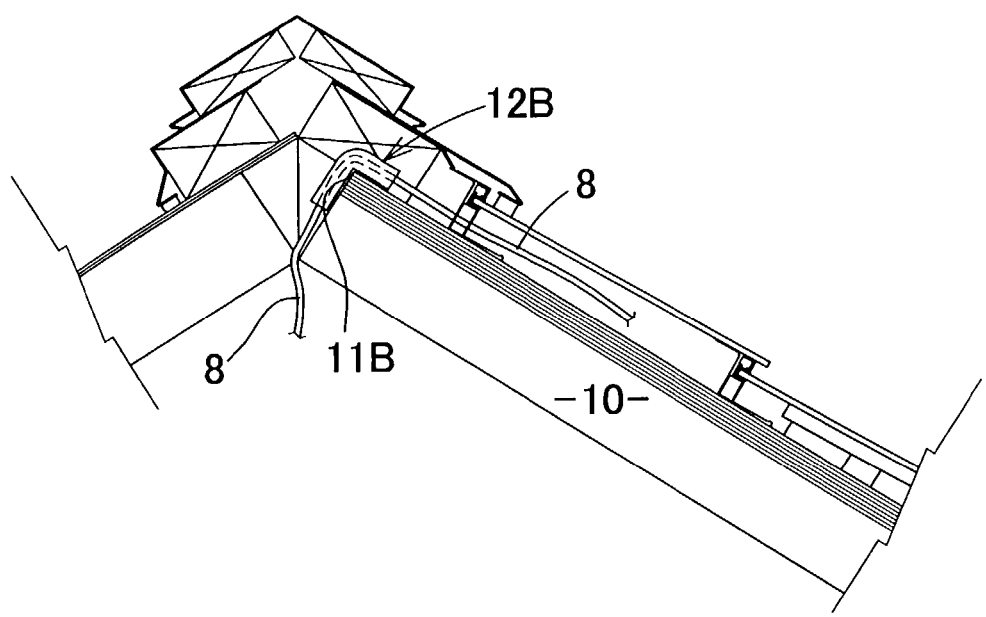
FIG. 10(a) is an illustration showing an example in which a wiring sleeve is provided to an insertion hole formed on the apex of a roof and FIG. 10(b) is a perspective view showing a wiring sleeve.
Figure 10:
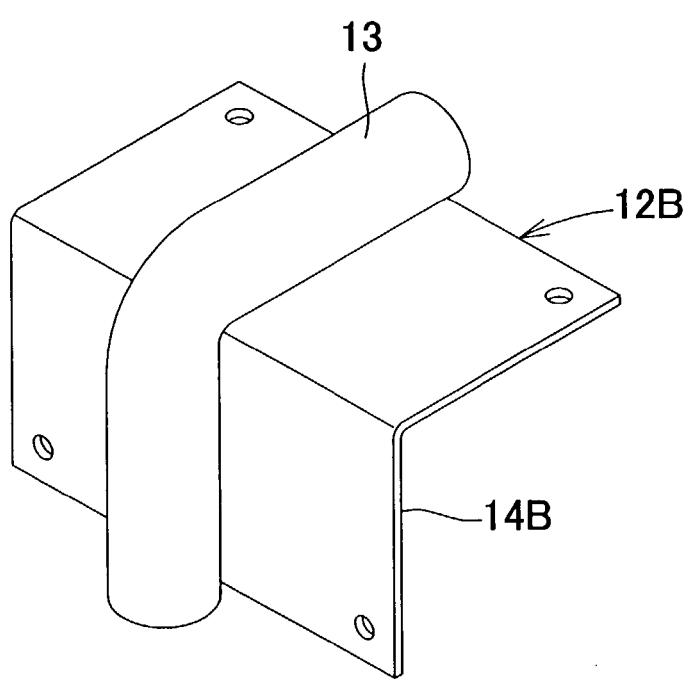
Figure 11:
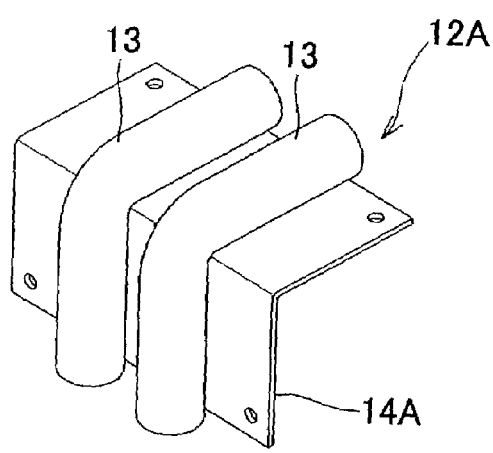
FIG. 11(a) is an illustration showing another example of a wiring sleeve provided to the apex of a roof and FIG. 11(b) is a perspective view showing a wiring sleeve.
Figure 11:
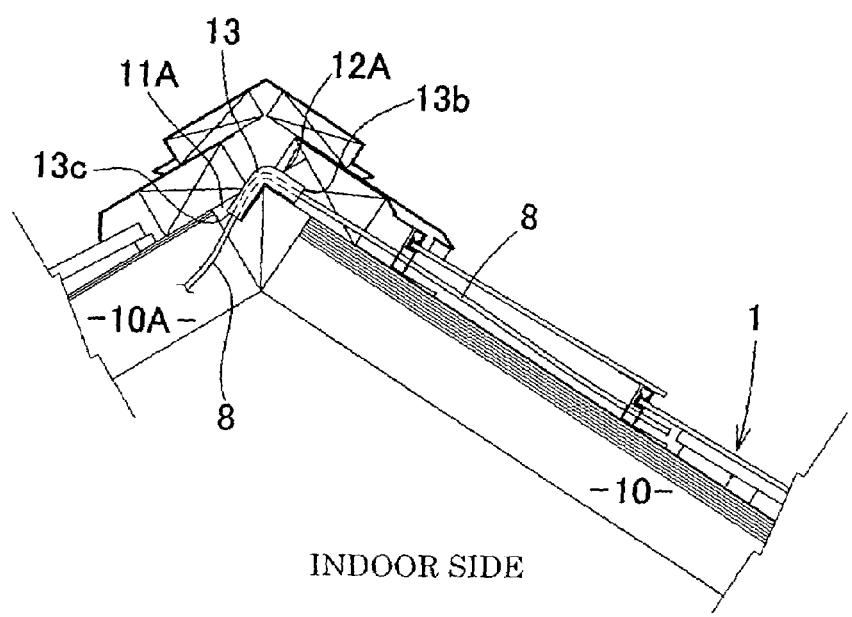

It is allowed to individually set the wiring sleeve 12 every drawing cable. Moreover, as shown in FIG. 9, it is also allowed to use a wiring sleeve 12A in which two or three or more cylindrical guide members 13, . . . are arranged in parallel.

Furthermore, the place to which the wiring sleeve 12 is set is not restricted to a position on a roofing board. As shown in FIGS. 10(a) and 10(b), the wiring structure is also a preferable embodiment, in which an insertion hole 11B is formed on a conventional roof apex, a wiring sleeve 12B provided with a bent flat flange 14B protruded along the surface of the roof body 10 and the insertion hole 11B is set to the insertion hole 11B, and the drawing cable 8 is guided to the insertion hole 11B.

Moreover, the wiring structure is a preferable embodiment, in which an insertion hole is formed on a conventional roof apex, a wiring sleeve 12A provided with a bent flat flange 14A protruded along the surface of a roof body and the insertion hole is set to the insertion hole, and a drawing cable 8 is guided to the hole as shown in FIG. 11(a). Thus, when introducing power into the indoor side from the roof apex by using a wiring sleeve 12A, as shown in FIG. 11(b), it is more preferable to form an insertion hole 11A on another roof body 10A adjacent to a roof body 10 on which cell modules 1 are arranged by using the ridge portion of a roof as a boundary, forming a cable entrance 13b at one end of a cylindrical guide member 13 on the surface of a roof body 10, and forming a cable exit 13c at the other end on the surface of the indoor side of a roof body 10A nearby the insertion hole 11A. Thus, by setting an elbow-type sleeve to a ridge portion and making a roof face on which a cable is introduced into the sleeve different from a roof face for introducing a cable into the inside of a house, water leakage from a sleeve setting portion is more effectively prevented. After inserting a cable into the cylindrical guide member, it is preferable to apply caulking to the opening and then, cover the whole sleeve with a waterproof tape so that water does not enter the sleeve.

Moreover, as shown in FIG. 6, when rainwater enters backsides of solar cell modules 1, . . . arranged on the roof body 10, the rainwater is quickly discharged to the eaves side through vertical and horizontal drain ditches 3, . . . opened on the contact face 2b of the adiabatic support member 2 and the insertion groove 61 formed on the support table 6 without staying in the ridge-side wall portion 2a or contact face 2b of the adiabatic support member 2. Moreover, because the drain ditches 3, . . . also serve as air-permeable grooves through which air circulates, the moisture at the backside of the solar cell module 1 is smoothly discharged.

<Second Embodiment in which Adiabatic Support Member Extending to Both Sides of Terminal Box is Integrally Formed>

Then, second embodiment of the present invention is described below by referring to FIG. 12. In the case of the solar cell module 1A of this embodiment, a concave portion 23 is formed on the setting position of a terminal box 42 instead of a pair of adiabatic support members 2 and 2 set to the both sides of the terminal box 42 at the backside of a solar cell 5 and a horizontal rectangular adiabatic support member 2A integrally molded over the both sides of the terminal box 42 is provided. Moreover, bottomed drain ditches 3A, . . . opening on the contact face to a roof body are formed on the adiabatic support member 2A so as to cross vertically and horizontally and communicate with the lateral side of the adiabatic support member 2A and output cables 41 and 41 extended from the terminal box 42 are temporarily and removably fixed in a drain ditch 3A until the solar cell module 1A is set on a roof body as illustrated and when drainwater enters the backside of the solar cell module 1A set on the roof body, the drainwater is quickly discharged to the eaves side through the above vertical and horizontal drain ditches 3A, . . . and the insertion groove 61 of a support table 6, and moreover, the moisture at the backside of the solar cell module 1A is smoothly discharged.

In the case of the above first embodiment, a plurality of compressed square-pole-shaped contact members 22 are protruded on the backside of the adiabatic support member 2 and the drain ditch 3 is formed between the contact members 22. In the case of the second embodiment, however, the contact member 22A is formed into a compressed cylindrical shape and a drain ditch 3A is formed between the contact members 22A. Therefore, the shape of a drain ditch of the present invention is not restricted. For example, when no output cable is temporarily fixed in a drain ditch, it is also a preferable embodiment to set the width of the drain ditch to a large value and further improve the drainage and air permeability at the backside of a solar cell module. Because other structures of the solar cell module 1A of this embodiment are basically the same as those of the first embodiment, the same configuration is provided with the same symbol and its description is omitted.

<Third Embodiment in which Cable-Holding Groove is Formed on Leg of Adiabatic Support Member>

Figure 13:
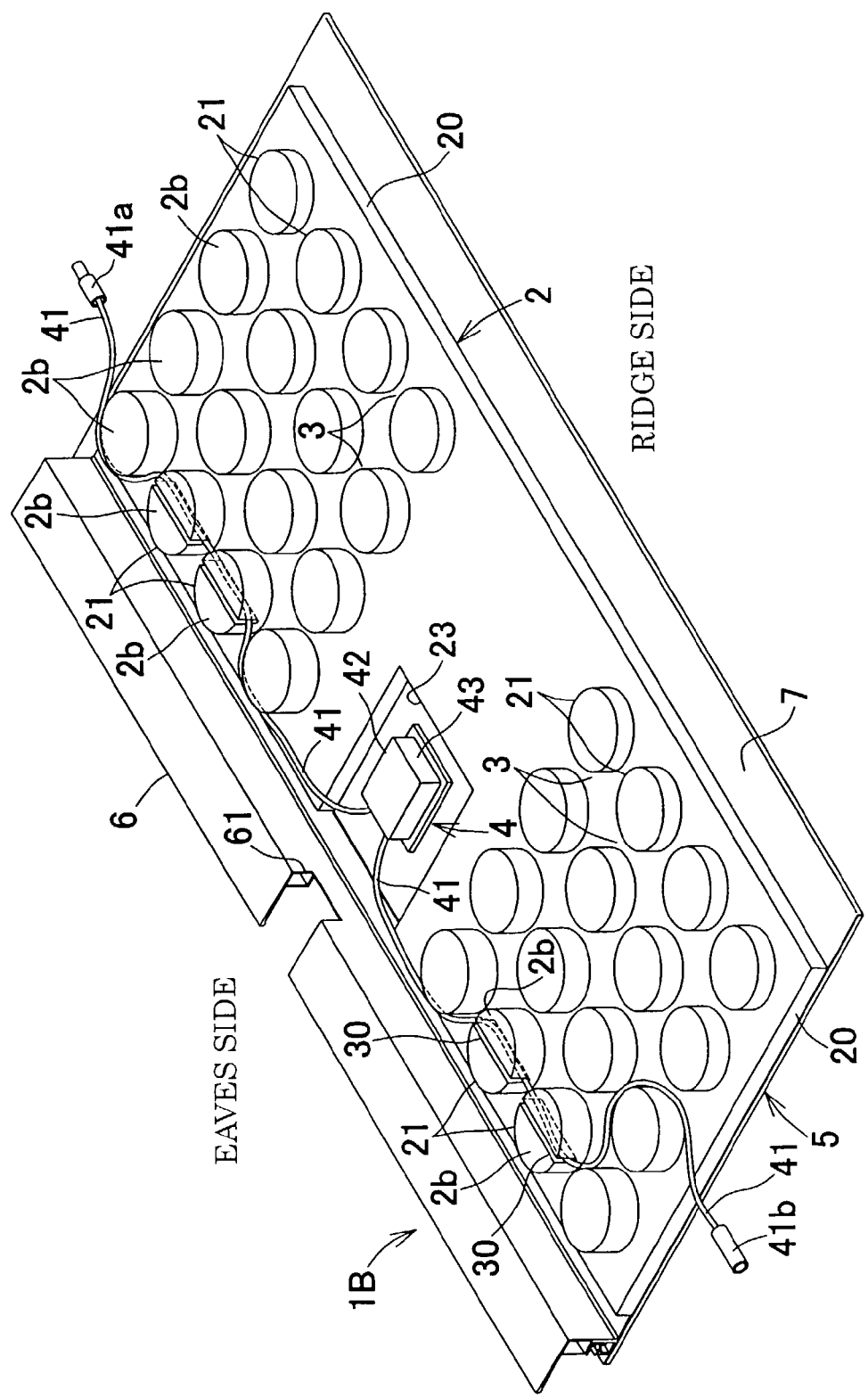
FIG. 13 is a perspective view showing the backside of a solar cell module of third embodiment in which a cable-holding groove is formed on the leg of an adiabatic support member.

Then, third embodiment of the present invention is described below by referring to FIGS. 13 to 18. As shown in FIG. 13, the solar cell module 1B of this embodiment is provided with a solar cell 5 constituting a roof member, output cables 41 and 41 extended from the backside of the solar cell, and an adiabatic support member 2 fixed to the backside of the solar cell 5 and contacting the surface of a roof body. The adiabatic support member 2 is constituted by a flat body portion 20 face-fixed to the backside of the solar cell 5 and a plurality of legs 21 . . . independent each other and vertically set to the roof body from the flat body portion 20.

In the case of this embodiment, a cable-holding groove 30 opening at a contact face 2b to a roof body and having a depth larger than that of a cable diameter and holding an inserted output cable 41 while housing the cable 41 without protruding it from the opening is provided to at least one leg selected out of the legs 21, . . . so as to communicate with the lateral side of the leg. By holding the output cable 41 with the cable-holding groove 30, it is prevented that the output cable 41 is held between the adiabatic support members 2, the working efficiency is improved under execution, the output cable 41 after execution is kept in the cable-holed groove 30 while floated from a substrate sheet, bleed of the output cable 41 is prevented, and the reliability of the solar cell module 1B is maintained for a long time.

As shown in FIG. 13, in the case of the solar cell module 1B, an output section 4 is constituted by disposing a metallic plate 7 such as a galvanism steel plate on almost entire surface of the back of the solar cell 5 except the portion on which the terminal box 42 is set so as to cover the surface and setting the terminal box 42 to which two output cables 41 having polarities different from each other are extended to about the center of the back of the solar cell 5. The horizontally-long adiabatic support member 2 integrally molded over the both sides of the terminal box 42 is fixed to the back of the metallic plate 7 by an adhesive. Moreover, the support table 6 on whose central portion the insertion groove 61 through which the output cable 41 or drawing cable 8 is inserted is formed is provided to the eaves-side end of the backside of the metallic plate 7 and a roof member which can be directly disposed on a roof body is independently constituted.

The adiabatic support member 2 is constituted by an elastic body in which a concave portion 23 is formed at a position to which the terminal box 42 is set and a horizontal rectangular flat body portion 20 continued over the both sides of the terminal box 42 and a plurality of compressed cylindrical legs 21, . . . independent each other and vertically set to the roof body from the flat body portion 20 are integrally molded with an extended synthetic resin or the like and the legs 21, . . . respectively have a function as a contact member in the above first and second embodiments and drain ditches 3, . . . are inevitably formed between these legs 21, . . . . The above adiabatic support member 2 sufficiently shows the indoor adiabatic effect and the annealing effect when using an amorphous-silicon solar cell by the flat body portion 20 face-fixed to the backside of the solar cell and the buffering effect as spacer between a solar cell and a roof body is sufficiently maintained by the flat body portion 20 and the legs 21, . . . vertically arranged at the roof body side.

The height of each leg 3(sic) is set to a value at least larger than the outside diameter of the output cable 41 and the interval between the legs is set to a value between 15 and 60 mm, preferably between 25 and 35 mm.

Moreover, a cable-holding groove 30 for holding the inserted cable 41 (8) opening on the contact face 2b to a roof body and having a depth larger than the cable diameter without protruding the cable 41 (8) from the opening is formed on at least one leg 21 present at a proper position among the legs 21, . . . so as to communicate with the lateral side of the leg 21.

Figure 14:
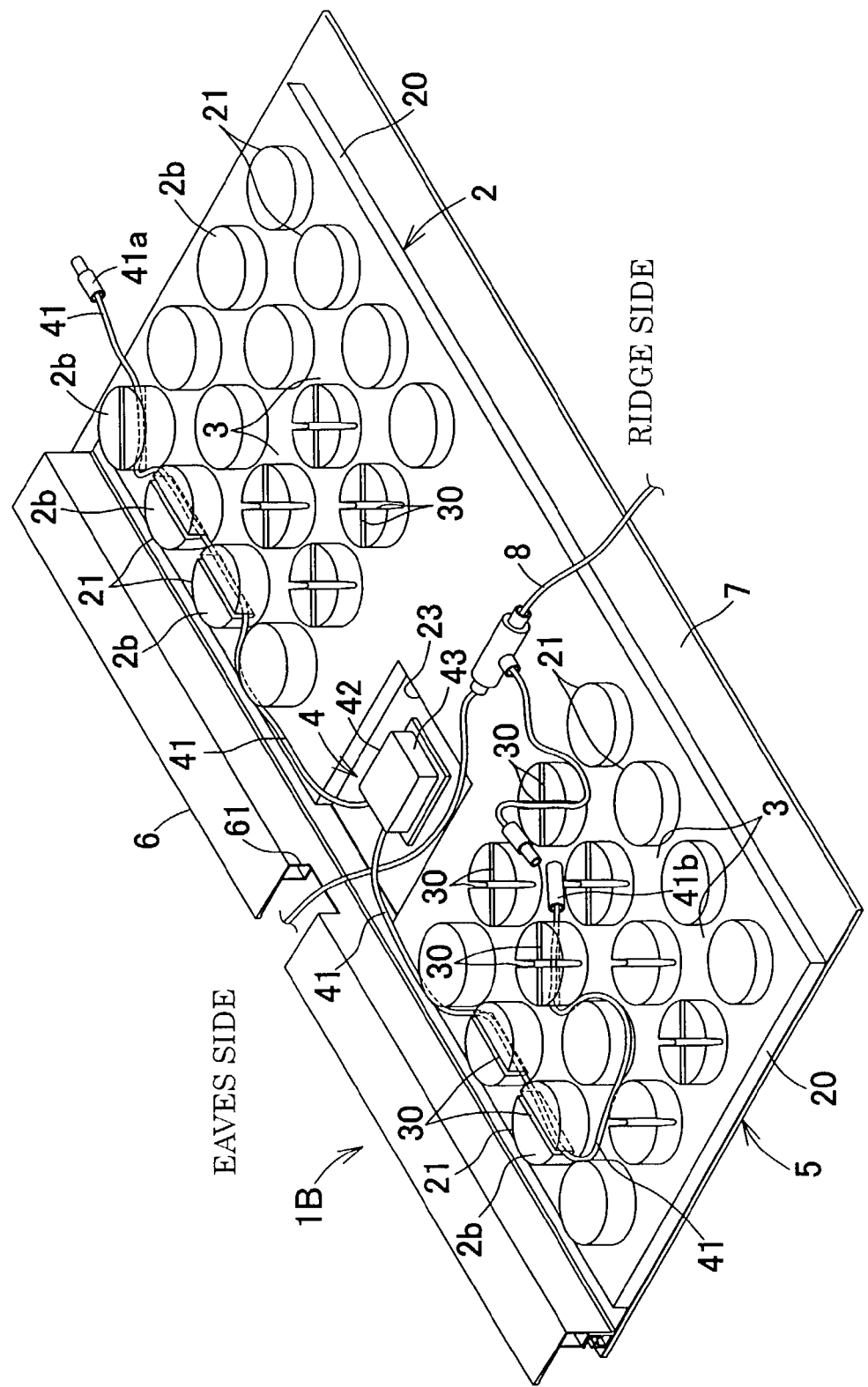
FIG. 14 is a backside perspective view showing an example of a modification formed by combining a plurality of cable-holding grooves at the contact face of a leg.
Figure 15:
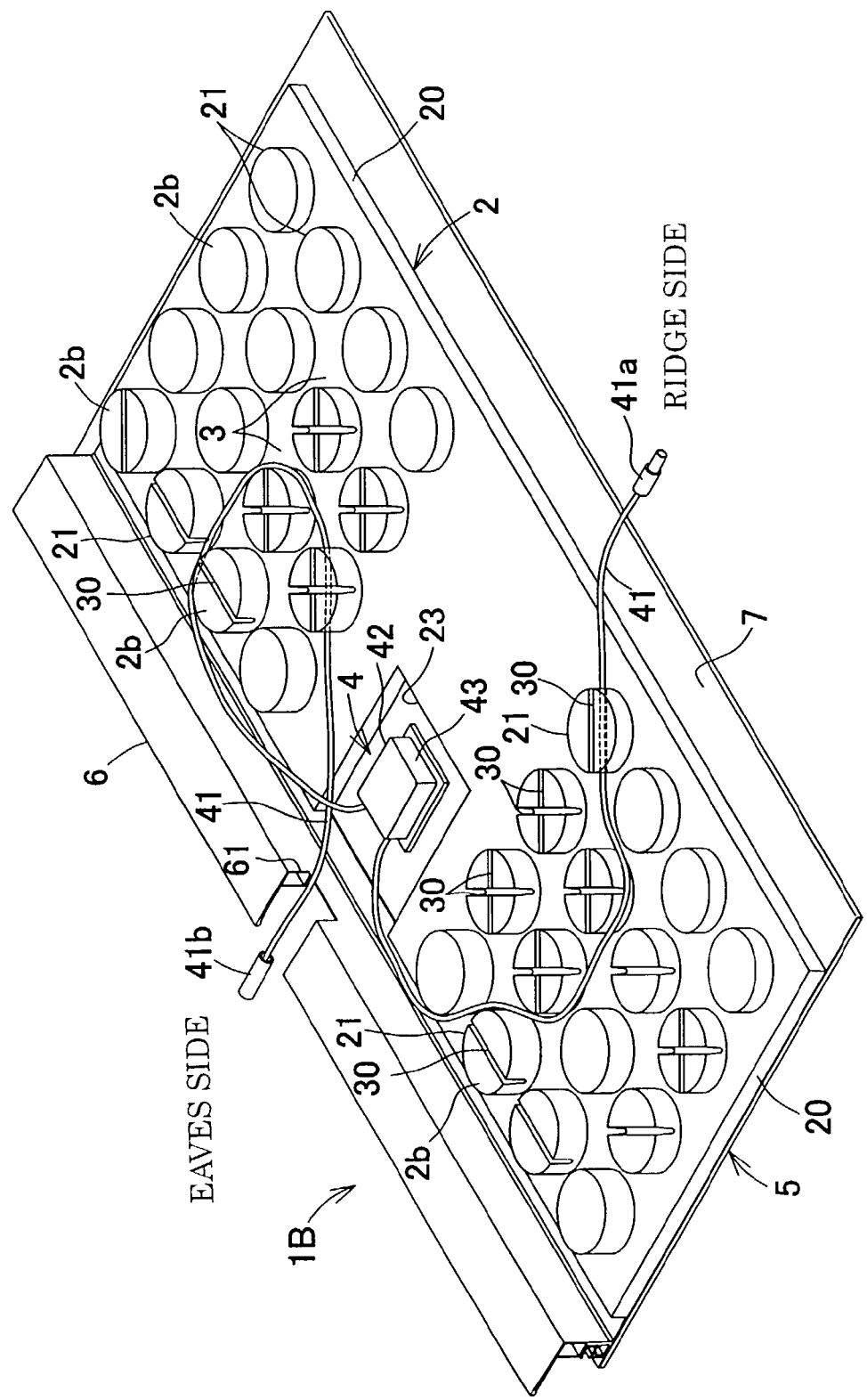
FIG. 15 is a backside perspective view showing an example in which an output cable is led to the ridge side and eaves side of a solar cell module.

As shown in FIGS. 13 to 15, it is preferable to use one groove which opens along a direction selected out of vertical, horizontal, diagonal, and moderate-curve directions or a combination of grooves which opens along the above directions, which is formed like a taper from an opening wider than a cable diameter toward a narrow bottom and elastically holds the inserted cable 41 (8) at a portion whose width is smaller than the cable diameter without protruding the cable from the opening as the cable-holding groove 30.

As an expanded synthetic resin for forming the adiabatic support member 2 constituted by the flat body portion 20 and legs 21, it is preferable to use an expanded synthetic resin made of a homopolymer of styrene, propylene, ethylene, or urethane or a copolymer mainly containing styrene, propylene, ethylene, and urethane, or a mixture of the above homopolymer or copolymer. Particularly, it is more preferable to use an expanded synthetic resin made of the homopolymer of styrene, propylene, or ethylene or copolymer mainly containing styrene, propylene, and ethylene and still more preferable to use the homopolymer of styrene, propylene, or ethylene.

Moreover, the adiabatic support members 2 are respectively fixed at the backside of the solar cell 5 at a strength at which the member 2 can be easily removed by human power and constituted so that a solar cell module can be easily removed from a roof body because these members 2 can be easily removed for maintenance. For example, to fix an adiabatic support member having a junction area of 0.3 m$^2$ to the backside of a solar cell, it is preferable to join the member by an adhesive so that the member can be easily removed from the back of the solar cell at a removing force of approx. 5 kg.

Moreover, as shown in FIGS. 13 to 15, after the solar cell module 1B is assembled, the above two output cables 41 and 41 extended from the housing 43 of the terminal box to the eaves side are inserted into the cable-holding groove 30 formed along the direction in which the cables are arranged and the drain ditches 3 between the legs 21, . . . , and securely held by the elastic holding force by the cable-holding groove 30 and the friction securing force from the drain ditches 3 in the adiabatic support member 2 without being removed until the solar cell module 1B is set on the roof body.

Figure 16:
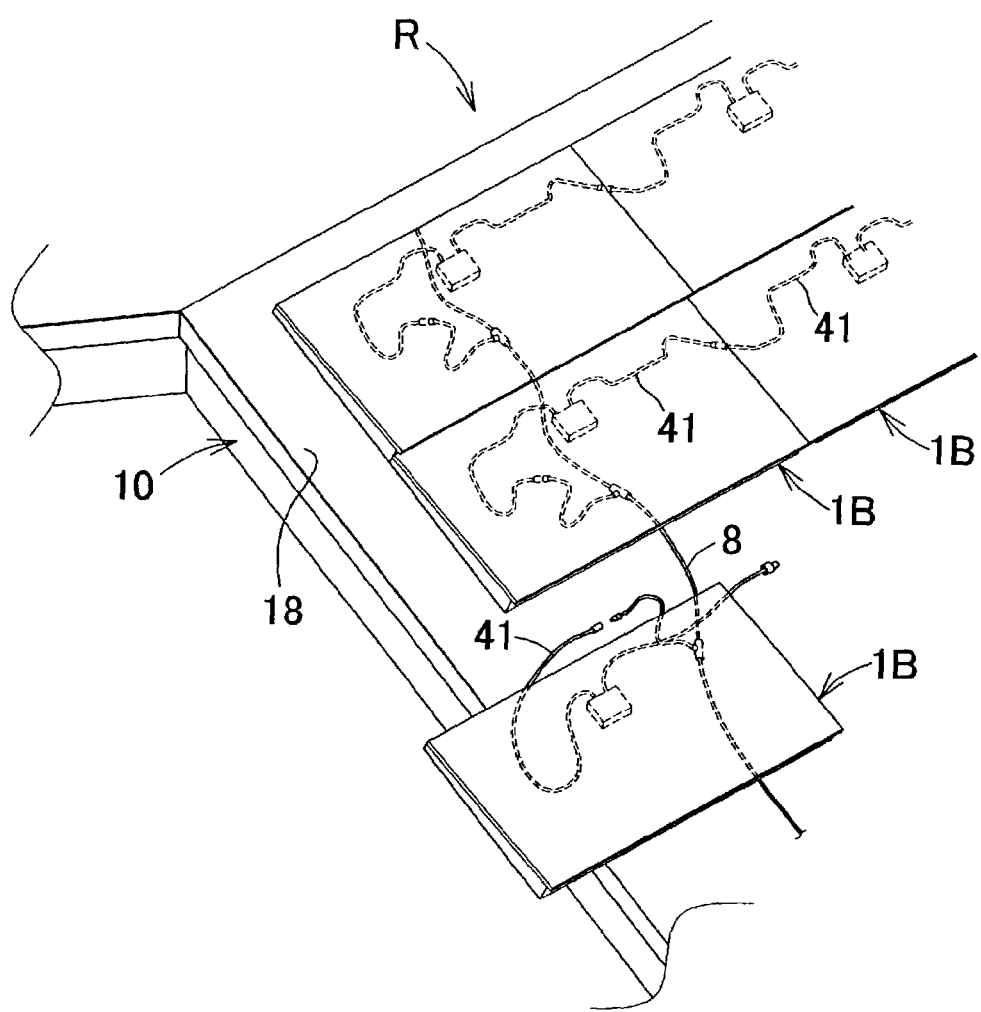
FIG. 16 is an illustration showing a roof equipped with a power-generating function constituted by arranging solar cell modules on a roof body.
Figure 17:
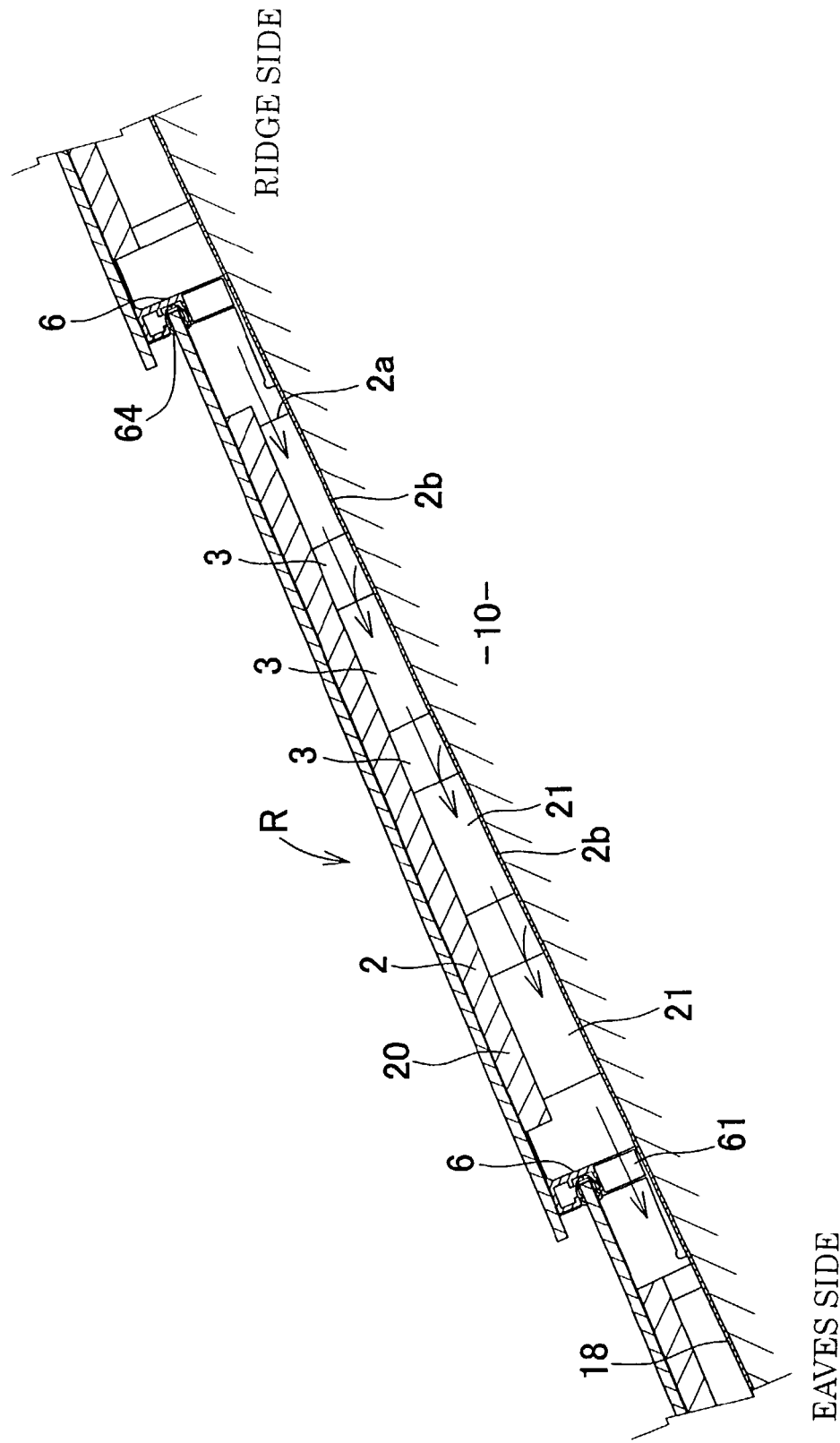
FIG. 17 is an illustration showing a state in which rainwater is discharged at the backside of a solar cell module.

FIG. 16 shows a roof R equipped with a power-generating function constituted by arranging these solar cell modules 1B along the outer face of the substrate sheet 18 on the surface of the roof body 10 and the solar cell modules 1B are connected each other in series by connecting the output cable 41 extended to the lateral side to the output cable 41 extended from the solar cell module 1B already adjacently fixed to the lateral side and the solar cell module 1B located at the leading end or trailing end of the above serial connection is connected to the drawing cable 8 extending from the indoor side through the insertion groove 61 of the support table 6 as also shown in FIG. 14. As also shown in FIG. 17, in the case of each solar cell module 1B, the ridge-side end is supported by the setting groove 64 of the support table 6 already adjacently fixed to the ridge side and the eaves-side end is supported by the support table 6 fixed to the backside and thereby, the adiabatic support member 2 provided to the backside is fixed while contacting the surface of the roof body 10. In this case, because the output cable 41 extended from the backside of each solar cell module 1B is held while housed in the cable-holding groove 30, a trouble is prevented that the output cable 41 is held between the adiabatic support members 2, that is, held between the contact faces 2b of the legs 21 when fixing the solar cell modules 1B and an unexpected trouble is avoided that the output cable enters the backside again after fixing the solar cell modules.

In the case of the roof R of the present invention equipped with a power-generating function in which the solar cell modules 1B, . . . are arranged on the roof body 10, if rainwater enters the backsides of the modules, the rainwater is quickly discharged to the eaves side as shown by the arrow through the drain ditches 3, . . . between legs and the insertion groove 61 provided to the support table 6 without staying in the ridge-side wall portion 2a of the adiabatic support member 2 or contact face 2b and the moisture at backsides of the solar cell modules 1B is smoothly discharged because the drain ditches 3, . . . also function as air permeable grooves through which air circulates as shown in FIG. 17.

Figure 18:
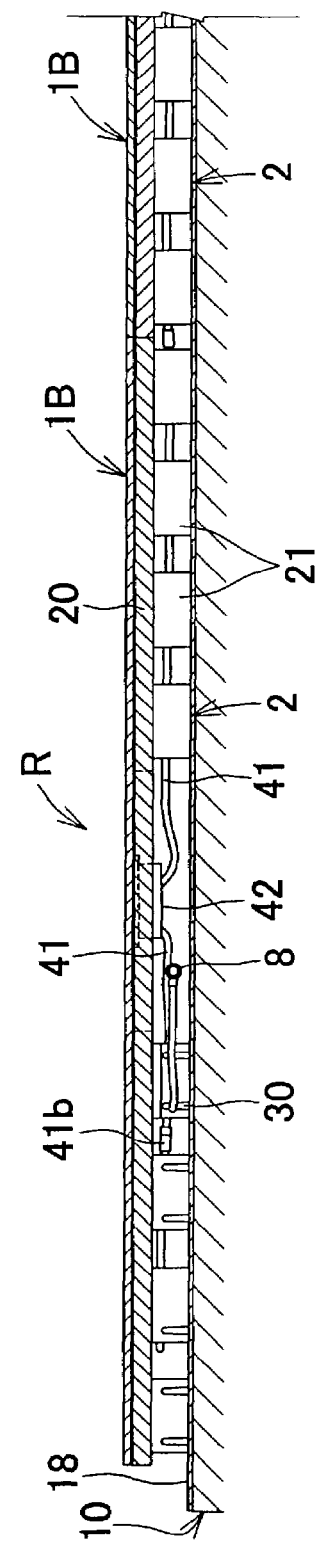
FIG. 18 is an illustration showing a state in which an output cable is held so as to be floated from a substrate sheet at the backside of a solar cell module.
Figure 19:
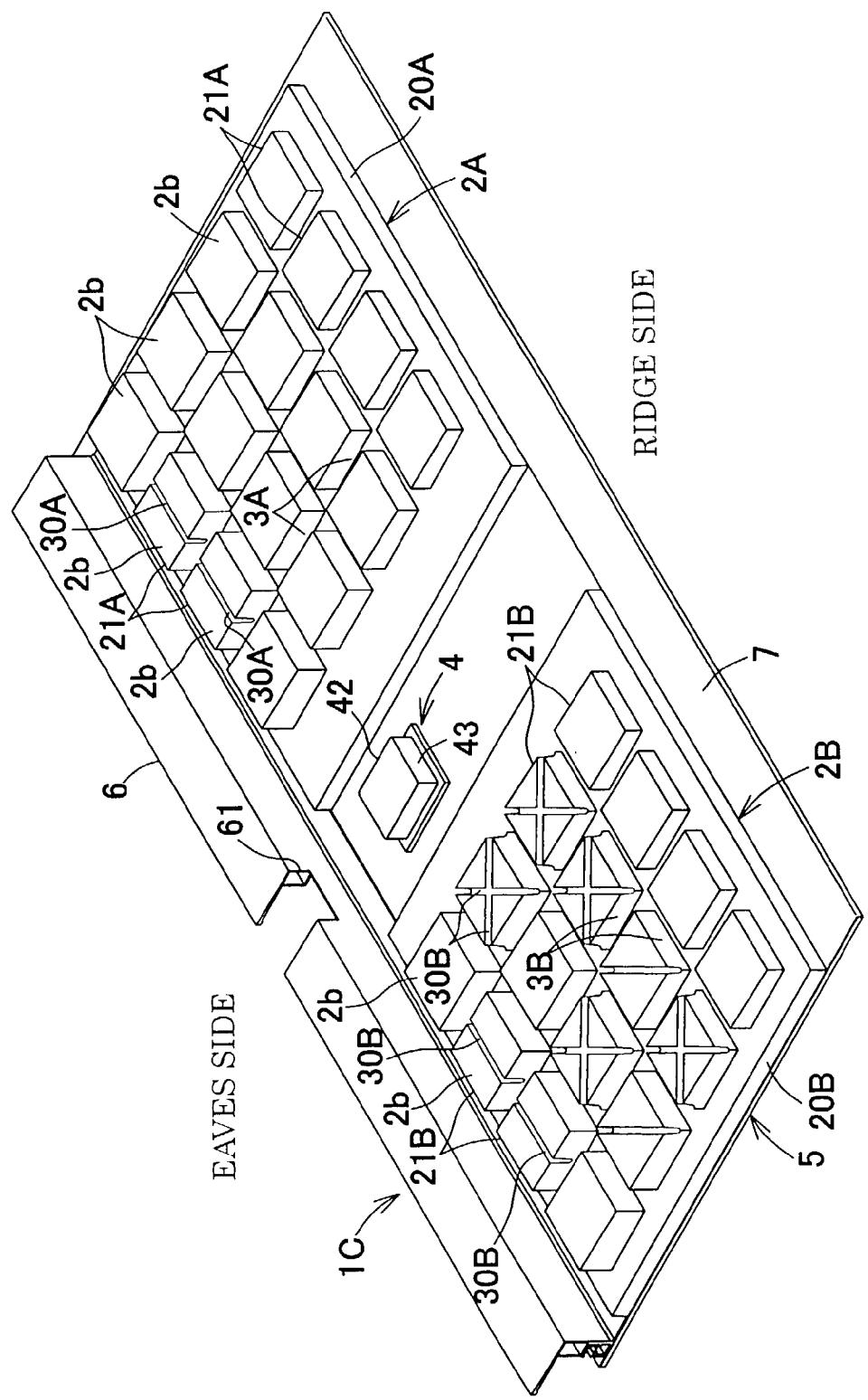
FIG. 19 is a backside perspective view showing a solar cell module of fourth embodiment in which a pair of adiabatic support members provided with a cable-holding groove are formed at the both sides of a terminal box independently each other.

Moreover, as shown in FIG. 18, because the output cable 41, . . . after execution are held in the cable-holing groove 30 while floated from the substrate sheet 18, bleed of the output cable 41 is prevented and the reliability of the solar cell modules is maintained for a long time.

<Fourth Embodiment which Includes Adiabatic Support Member Having Cable-Holding Groove at Both Sides of Terminal Box>

Then, fourth embodiment of the present invention is described below by referring to FIG. 19. The solar cell module 1C of this embodiment has a pair of adiabatic support members 2A and 2B formed at the both sides of a terminal box 42 independently each other instead of the continued adiabatic support member 2 in the third embodiment. Each adiabatic support member 2A (2B) is an elastic body obtained by integrally molding a flat body portion 20A (20B) and a plurality of compressed square-pole-shaped legs 21A, . . . by an expanded synthetic resin or the like and a cable-holding groove 30A opening at a contact face 2b to a roof body and having a depth larger than a cable diameter to house a not-illustrated inserted cable while housing the cable without protruding the cable from the opening is formed on at least one leg of the legs 21A, . . . located at a proper position so as to communicate with the lateral side of the leg 21. It is also preferable to use one groove opening along a direction selected out of vertical, horizontal, and moderate-curve directions or a combination of grooves opening along vertical, horizontal, and moderate-curve directions, which is formed like a taper from the opening wider than a cable diameter toward the narrow bottom as the cable-holding groove 30A (30B) and elastically holds an inserted cable at a portion whose width is narrower than the cable diameter.

In the case of this embodiment, one cable-holding groove 30A is formed on two legs 21A and 21A respectively along a cable extended to the lateral side of the adiabatic support member 2A of the members 2A and 2B at the both sides of the terminal box 42 and one or cable-holding groove 30B or two cable-holding grooves 30B crossing each other on a diagonal line is or are formed on proper legs 21B, . . . of the other adiabatic support member 2B in order to hold a drawing cable and output cable at the central portion. Therefore, this embodiment is similar to the solar cell module 1B shown in FIG. 14 of the above third embodiment. However, because the adiabatic support members 2A and 2B are independently constituted each other, this configuration is more flexible in assembling a solar cell module and arranging cable-holding grooves.

Because other structures are the same as those of the third embodiment, the same configuration is provided with the same symbol and its description is omitted.

<Fifth Embodiment in which a Plurality of Geta Members are Arranged at Bottom of Support Table>

Figure 20:
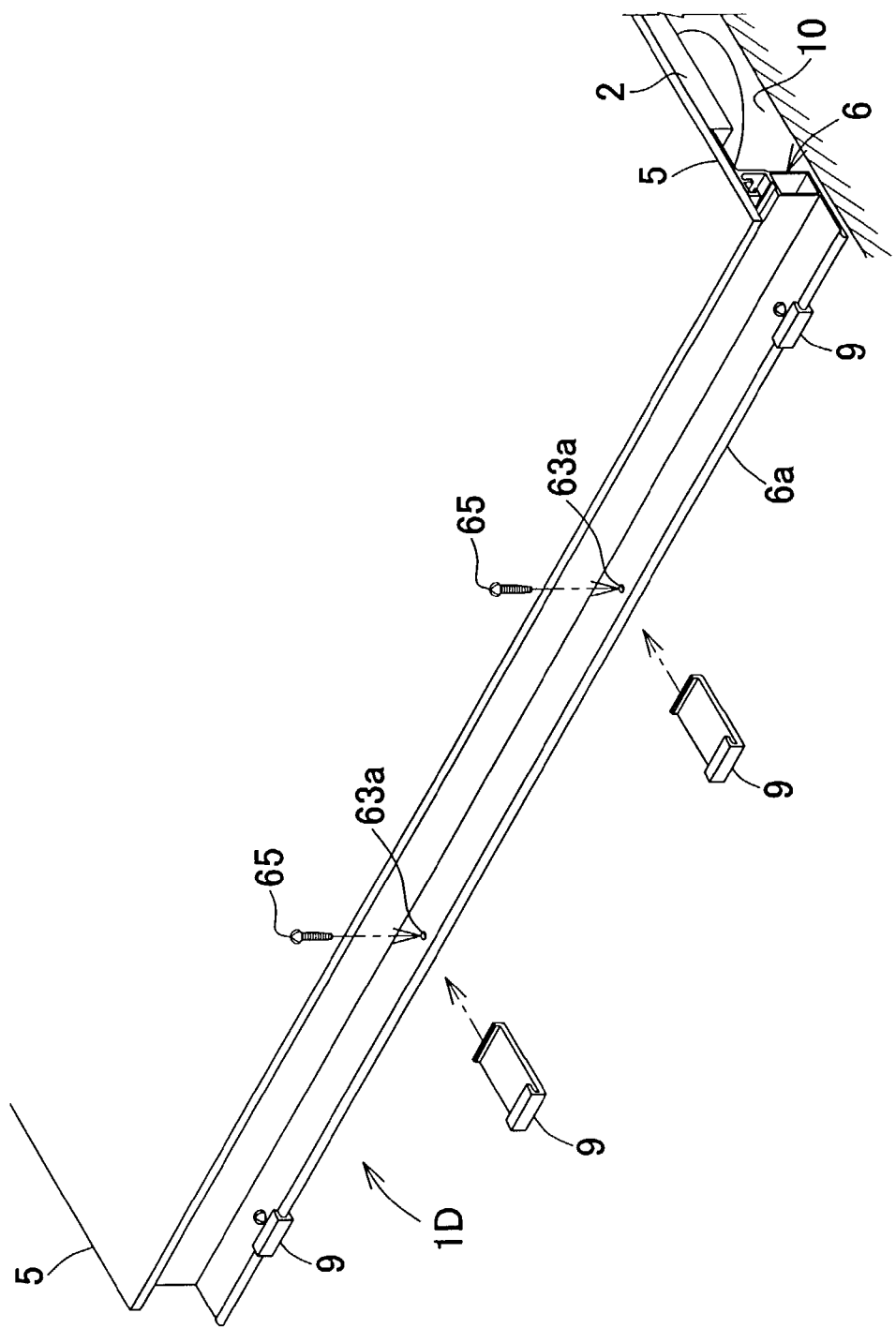
FIG. 20 is an illustration showing an essential portion of a solar cell module of fifth embodiment in which a plurality of geta members are arranged at the bottom of a support table.
Figure 26:
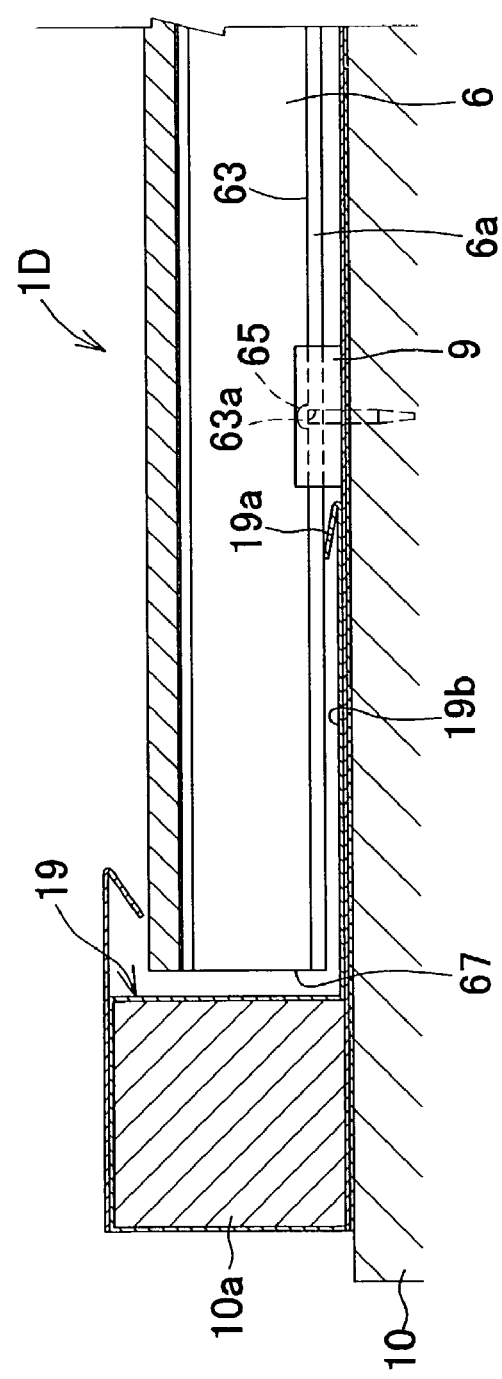
FIG. 26 is an illustration showing a state in which a solar cell module is set to verge-substrate dewatering eaves so as to cover them.

Then, fifth embodiment of the present invention is described below by referring to FIGS. 20 to 26. As shown in FIG. 20, the solar cell module 1D of the present invention is a building-material-integrated solar cell module provided with a solar cell 5 constituting a roof member and a support table 6 for supporting the solar cell to fix it to a roof body 10, in which a plurality of geta members 9, . . . are arranged at the bottom 6a of the support table 6 facing the roof body 10. Thus, because the present invention is provided with the geta member 9 for floating the support table 6 from the roof body 10, rainwater is smoothly discharged through a water channel 19b of the verge-substrate dewatering eaves 19 without crushing a bent portion 19a for stopping the rainwater when setting the solar cell module 1D to the upper side of a verge-substrate dewatering eaves 19 so as to cover the eaves 19 as shown in FIG. 26.

The applicable range of the geta member 9 described for this embodiment is not restricted to a solar cell module of the present invention having the following drain ditch and cable-holding groove but the geta member 9 is widely preferably used for building-material-integrated solar cell modules having no drain ditch or cable-holding groove.

Figure 21:
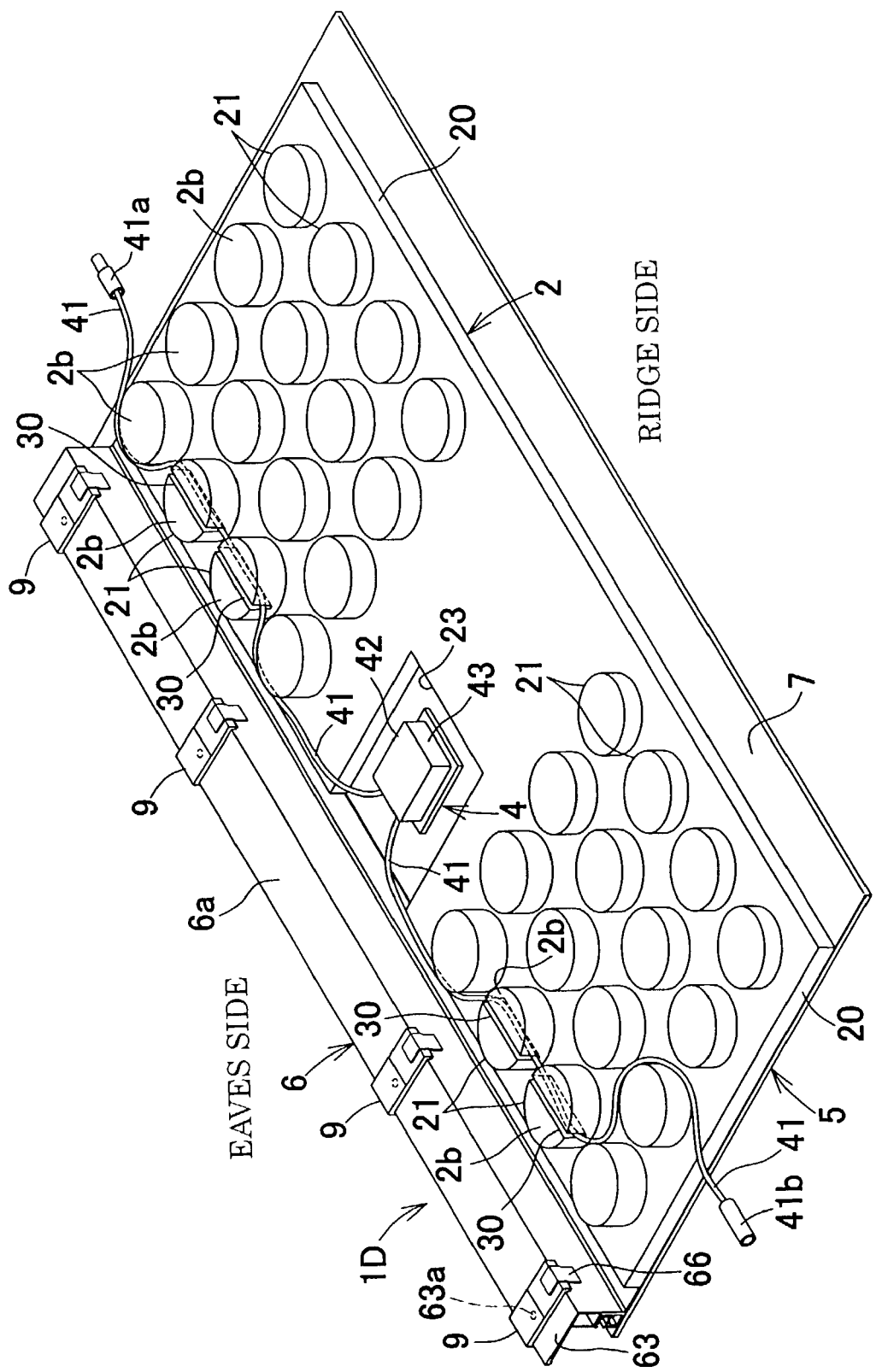
FIG. 21 is a perspective view of a solar cell module viewed from the backside of the module.

As shown in FIG. 21, in the case of the solar cell module 1D of the this embodiment, an output section 4 is constituted by setting a metallic plate 7 made of a galvanism steel plate or the like to almost entire surface of the solar cell 5 except the portion where a terminal box 42 from which two output cables 41 and 41 having polarities different from each other are extended is set at the back of the solar cell 5 so as to cover the solar cell 5 and setting the terminal box 42 to about the center of the backside of the solar cell 5. A horizontally-long adiabatic support member 2 integrally molded over the both sides of the terminal box 42 is fixed to the back of the metallic plate 7 by an adhesive. Moreover, the support table 6 on whose bottom 6a the geta members 9, . . . are arranged is provided to the eaves-side end of the back of the metallic plate 7 and thereby, a building-material-integrated solar cell module is constituted as a roof member which can be independently directly disposed on the roof body 10. For the adiabatic support member 2, it is possible to properly use not only the above integrally-molded type but also a plurality of separately-constituted adiabatic support members such as a pair of adiabatic support members independently formed on both sides of the terminal box 42.

The adiabatic support member 2 is constituted by an elastic body obtained by integrally molding a horizontally-long rectangular body portion 20 in which a concave portion 23 is formed on a position to which the terminal box 42 is set and which is continued over the both sides of the terminal box 42 and a plurality of compressed cylindrical legs 21, . . . independently each other and vertically set to the roof body from the flat body portion 20. Therefore, the indoor adiabatic effect and the annealing effect when using an amorphous-silicon solar cell are sufficiently shown by the flat body portion 20 face-fixed to the backside of the solar cell 5 and the buffering effect as a spacer between a solar cell and the roof body is sufficiently shown by the flat body portion 20 and the plural legs 21, . . . vertically set to the roof body side.

A cable-holding groove 30 opening at the contact face 2b to the roof body and having a depth larger than a cable diameter to hold an inserted cable 41 (8) while housing it without protruding the cable 41 (8) from the opening is formed on the leg 21 present at a proper position among the above legs 21, . . . so as to communicate with the lateral side of the leg 21.

It is preferable that the adiabatic support member 2 is integrally molded by an expanded synthetic resin made of a homopolymer of styrene, propylene, ethylene, or urethane, a copolymer mainly containing styrene, propylene, ethylene, and urethane, or a mixture of the homopolymer or copolymer. It is more preferable that the member 2 is molded by an expanded synthetic resin made of a homopolymer of styrene, propylene, or ethylene or a copolymer mainly containing styrene, propylene, and ethylene. It is still more preferable that the member 2 is molded by a homopolymer of styrene, propylene, or ethylene. Moreover, the adiabatic member 2 is fixed by a strength at which the member 2 can be easily removed by human power at the backside of the solar cell 5 and constituted so that a solar cell module can be easily removed from a roof body because the adiabatic support members 2 are easily removed for maintenance. For example, to fix an adiabatic support member having a junction area of 0.3 m$^2$ to the backside of a solar cell, it is preferable that the member is joined by using an adhesive so that it can be easily removed from the backside of the solar cell at a removing force of approx. 5 kg.

Figure 22:
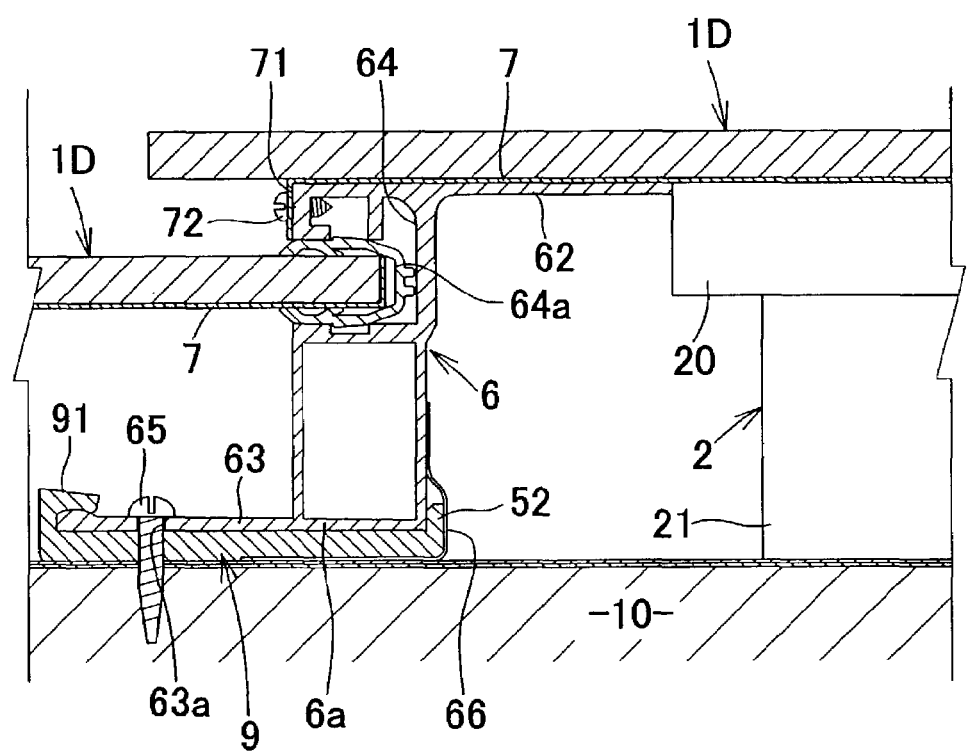
FIG. 22 is a sectional view showing a state of fixing the support table of a solar cell module on a roof body.

The support table 6 is made of aluminum and as shown in FIG. 22, an inward flange 62 attached along the eaves-side of the back of the metallic plate 7 is formed on the upper side of the table 6 so as to protrude along the width direction of the solar cell module 1D, that is, along the longitudinal direction and a screw hole opening outward is formed correspondingly to a not-illustrated through-hole for a setscrew 72 drilled at a bent portion 71 formed by bending the eaves-side end of the metallic plate 7.

A setting groove 64 is formed at the middle of the upper stage, which receives and engages with the ridge-side end of the solar cell module 1D opening outward along the longitudinal direction and adjacently set to the eaves side together with the metallic plate 7 and a waterproof gasket 64*a*. Moreover, an outward flange 63 on which a screw hole 63*a* for fixing the support table 6 to the roof body 10 by setscrews or nails is drilled at several places is formed along the longitudinal direction so as to protrude and a plurality of geta members 9 of the present invention shown in FIGS. 23(*a*) to 23(*c*) are disposed on the outward flange 63.

Each of the geta members 9 has a function as a spacer whose thickness is set so that the bottom 6*a* of the support table floated by the geta members 9 does not crush the bent portion 19*a* of the verge-substrate dewatering eaves when setting the solar cell module 1D to the upper side of the verge-substrate dewatering eaves 19 on the margin of the roof body so as to cover the dewatering eaves 19. Therefore, though the shape and material of the geta member 9 are not restricted, it is preferable that the geta member 9 is made of rubber and more preferable that the member 9 is formed by EPDM or chloroprene from which superior durability (heat resistance or weather resistance) is obtained and set to a JIS hardness of 50 to 70.

When each geta member 9 is set to a position for covering the opening of the screw hole 63*a* drilled on an outward flange, it is unnecessary to form a prepared hole for the geta member 9 and functions as a waterproof sealing material closely contacting with the bottom 6*a* of the support table, screw hole 63*a*, and substrate sheet of the roof body when fixing the outward flange 63 to the roof body by setscrews or nails, and thus, it is possible to omit the caulking of a fixed portion which has been necessary so far for execution.

Figure 23:
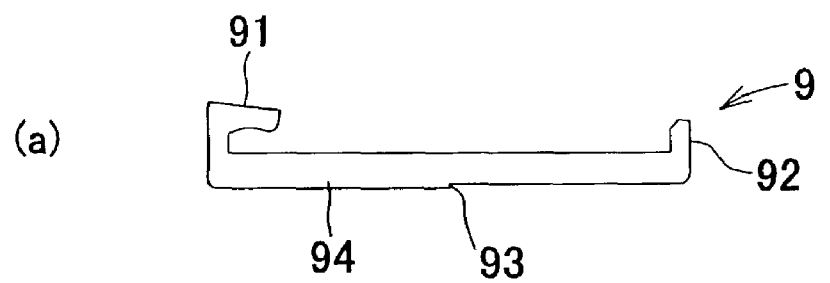
FIG. 23(a) is a front view showing a geta member to be set to a support table.
FIG. 23(b) is a top view showing the geta member.
FIG. 23(c) is a perspective view showing the geta member.
Figure 23:
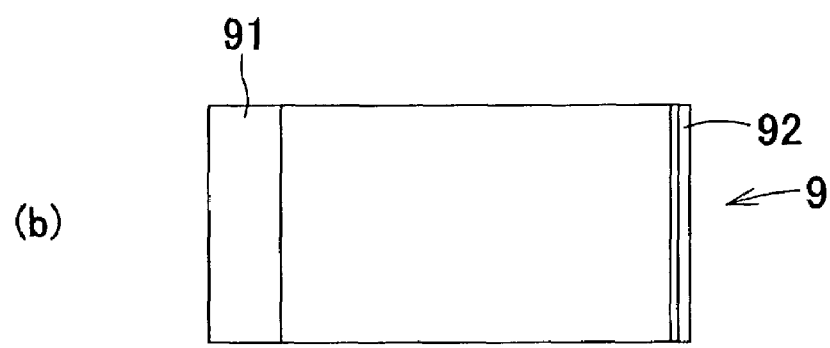
Figure 23:
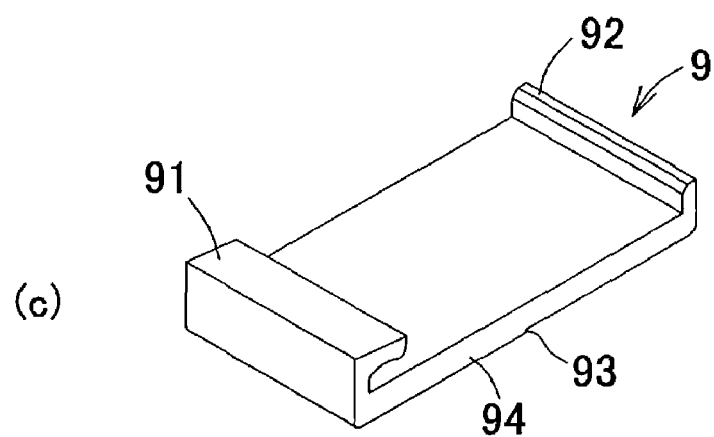

It is allowed that these geta members 9 are previously fixed to the bottom 6*a* of the support table 6 or held between the bottom 6*a* and roof body 10 when setting the support table 6 to the roof body 10. However, as shown in FIGS. 23(*a*) to 23(*c*), the geta member 9 of this embodiment is a contour-extrusion molded product cut into approx. 30 mm in width provided with a holding portion 91 for fit-holding the protruded end of the outward flange 63 like a U shape and a protruded portion 92 protruded upward from the proximal end of the outward flange 63 and being secured by the inner wall of the support table 6. By holding the bottom 6*a* of the support table at front and rear by the holding portion 91 and protruded portion 92, the geta member 9 is set to the support table 6 by one touch and previously closely held by the outward flange 63 before a solar cell module is set on a roof.

In the case of each geta member 9, thick-wall portions 94 are formed on a portion at which the opening of the screw hole 63*a* is located through a step 93. When fixing the support table 6 to the roof body 10, these thick-wall portions 94 are contact-bonded to the roof body to increase the face pressure of the portion and thereby further improve the waterproof sealing performance. Moreover, as shown in FIGS. 21 and 22, a one-side adhesive tape 66 whose surface is waxed is attached to the portion from the step 93 up to the opposite-side protruded portion 92 and the remaining portion of the tape 66 is attached to the inner wall of the support table and thereby, the geta members 9 are stably held by the support table 6.

The thickness of these geta members 9 is set so as not to crush the bent portion 19*a* of the general verge-substrate dewatering eaves 19 by considering the height of the bent portion 19*a*, that is, so as not to pressure-weld the bent portion 19*a* or so that the water-stop effect by the bent portion 19*a* can be kept even if the bent portion 19*a* is pressure-welded, and thus the thickness is preferably set to 4 to 5 mm.

Figure 24:
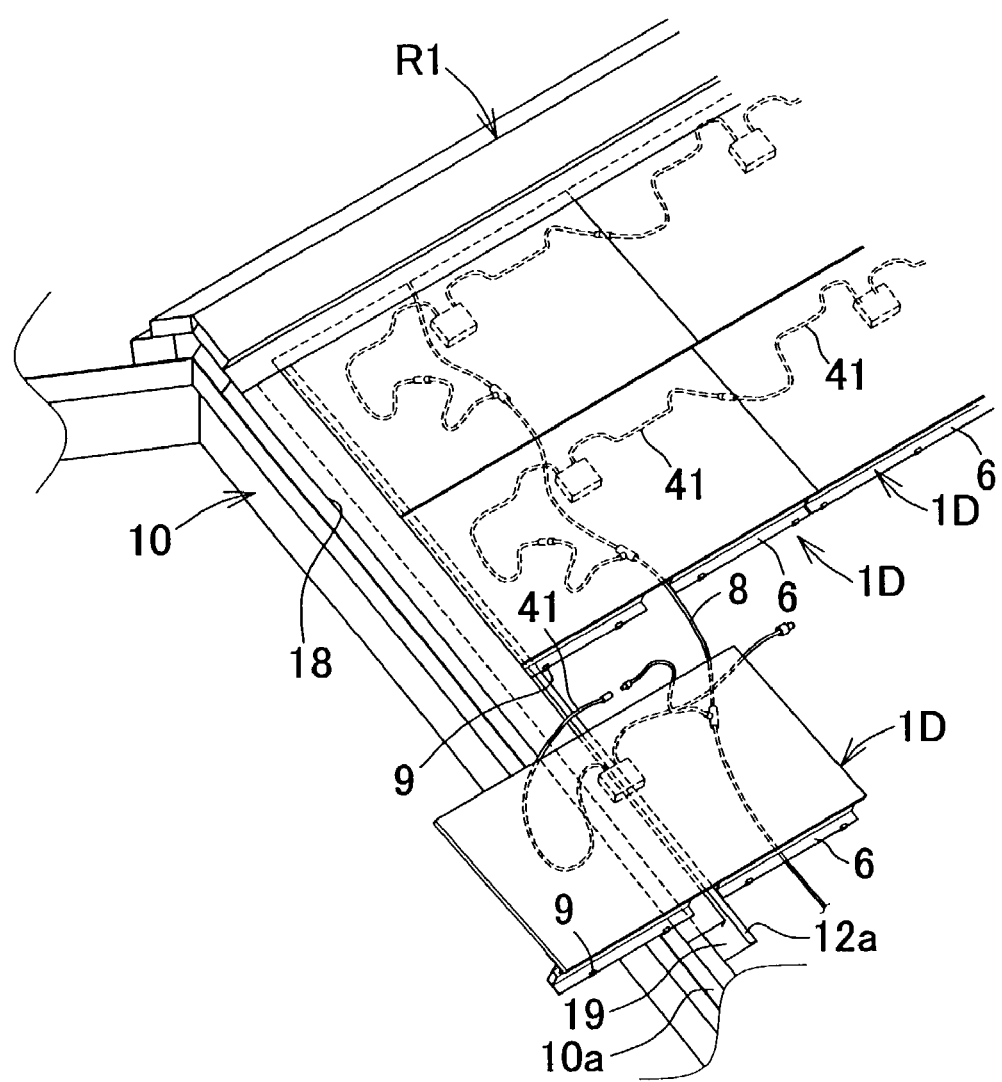
FIG. 24 is an illustration showing a roof equipped with a power-generating function in which solar cell modules are arranged on a roof body.
Figure 25:
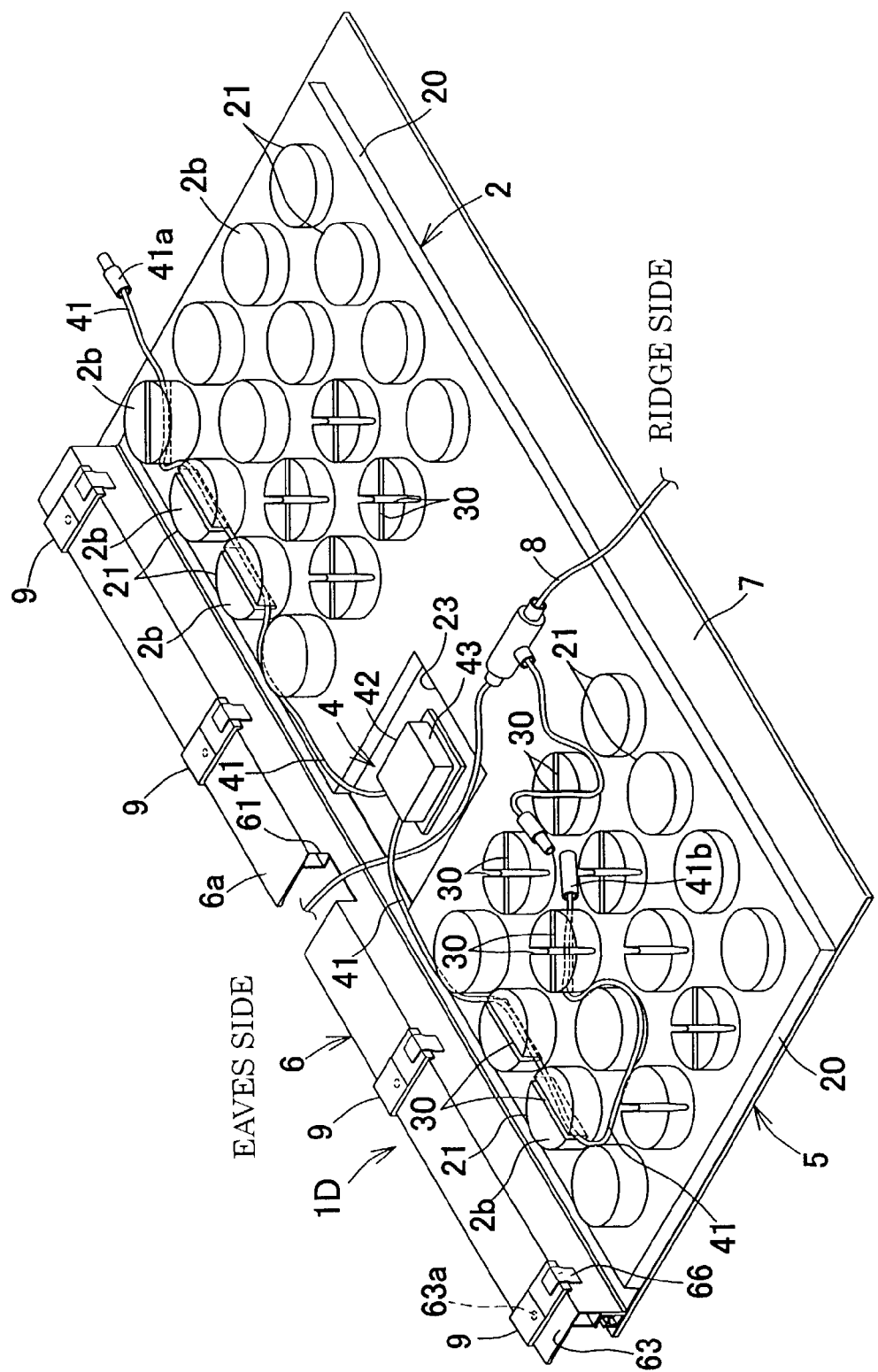
FIG. 25 is a perspective view showing a solar cell module to be connected to a drawing cable viewed from the backside of the module.

FIG. 24 shows a roof R1 equipped with a power-generating function constituted by arranging a plurality of the solar cell modules 1D along the outer face of the substrate sheet 18 on the surface of the roof body 10. In the case of each solar cell module 1D, as shown in FIG. 22, the ridge-side end is supported by the support-table setting groove 64 already fixed to the ridge side and eaves side is supported by the support table 6 fixed to the backside and thereby, the solar cell modules 1D are successively fixed on the roof body 10.

When fitting the ridge-side end of each solar cell module 1D to the setting groove 64, it is necessary to slide the support table 6 on the substrate sheet 18 of the roof body. However, because the adhesive tape 66 is attached to the fitting-directional front end of each geta member 9 directly contacting the substrate sheet 18, each geta member 9 is not removed from the support table 6 though it is entirely made of rubber and thus, the support table 6 can smoothly slide on the substrate sheet 18. Therefore, the ridge-side end of the solar cell module 1D is smoothly fitted to the setting groove 64 and the execution efficiency is prevented from deteriorating. To slide the geta member 9 on the substrate sheet 18, it is also effective not only to attach the above waxed adhesive tape 66 to the geta member 9 but also to attach paraffin paper to the member 9 or skids to the surface of the member 9. Moreover, it is a preferable embodiment to tilt the bottom face of the outward flange 63 on which the geta member 9 is set or the bottom face of the geta member 9 upward by approx. 2° from the upper face of the roof body toward the protruded end of the flange or holding portion 91 of the geta member 9.

Figure 7:
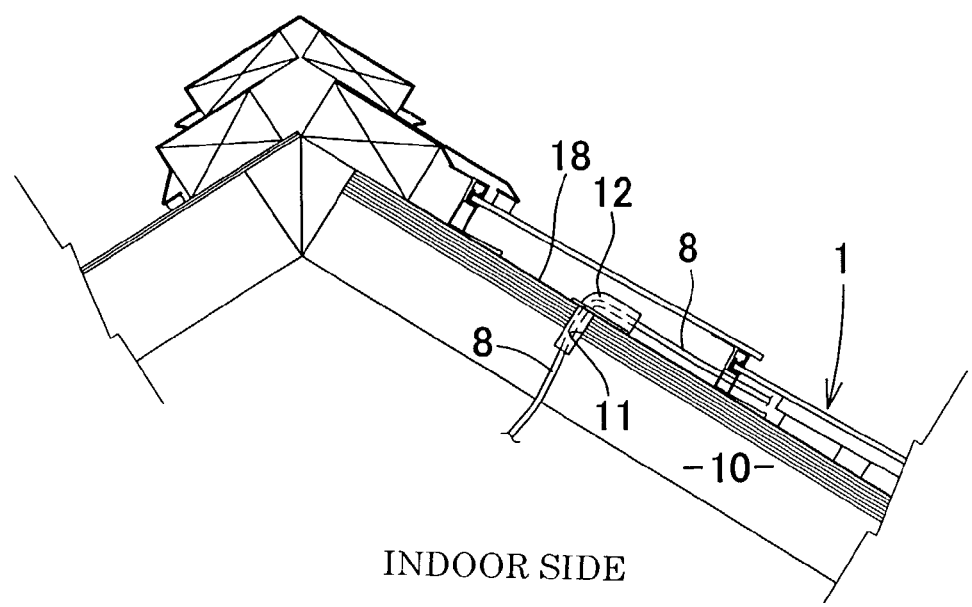
FIG. 7 is an illustration showing a wiring sleeve for guiding a drawing cable to the inside of a house.

In the case of wiring of the roof R equipped with a power-generating function constituted by arranging the solar cell modules 1D on the roof body 10, the solar cell modules 1D are connected each other in series by connecting an output cable 41 extended to the lateral side of each solar cell module 1D to an output cable 41 already extended from the solar cell module 1D adjacently fixed to the lateral side and the solar cell module 1D located at the leading or trailing end of the serial connection has the back structure shown in FIG. 6 and is connected to a drawing cable 8 extended form the indoor side through the insertion groove 61 formed on the support table 6. The drawing cable 8 is conventionally introduced into the inside of a house through an insertion hole formed on the apex of the ridge-side roof body. However, it is preferable that the wiring sleeve 12 shown in FIG. 7 is set to an insertion hole 11 and the cable 8 is guided through the sleeve and introduced into the indoor side.

In the case of the roof R1 equipped with a power-generating function constituted as described above, the output cable 41 of each solar cell module 1D is housed and held in the cable-holding groove 30 formed on the adiabatic support member 2 at the backside. Therefore, when fixing the solar cell module 1D, a trouble is prevented that the output cable 41 is held between the adiabatic support members 2, that is, held between the contact faces 2*b* of the leg 21 and an unexpected trouble is prevented that the output cable 41 enters the backside again after fixing the solar cell module. Therefore, a superior operability is maintained and bleed of the output cable 41 is prevented because the cable 41 is held in the cable-holding groove 30 while floated from the substrate sheet 18 and therefore, the power-generating capacity and reliability are maintained for a long time.

Moreover, as shown inn FIG. 26, each solar cell module 1D set to the upper side of the verge-substrate dewatering eaves 19 at the both margins of the roof body is set without crushing the bent portion 19a by each geta member 9 disposed on the bottom 6a of the support table and rainwater incoming from the gap between a corrosion-resistant adjuster 10a and the solar cell module 1D is smoothly discharged toward the eaves side through the verge-substrate dewatering eaves 19b. In the case of the solar cell module 1D set to the upper side of the verge-substrate dewatering eaves 19, a screw hole 63a is drilled at a position 90 to 100 mm separate from the end 67 of the support table 6 so that the screw hole is not located at the water channel 19b of the verge-substrate dewatering eaves 19 due to rain end. In the case of this embodiment, the geta member 9 is provided in accordance with the position. However, the location of a geta member of the present invention is not restricted to a position for covering the opening of a screw hole. It is also possible to properly provide the geta member to a position at which a screw hole of the support-table bottom 6a does not open or it is allowed that the geta member thus provided is a geta member attaching to the inside of the water channel 19b of a verge-substrate dewatering eaves as long as the geta member does not extremely interrupt a water flow.

<Sixth Embodiment that Constitutes Tub Structure and is Disposed Together with Roof Tile>

Figure 27:
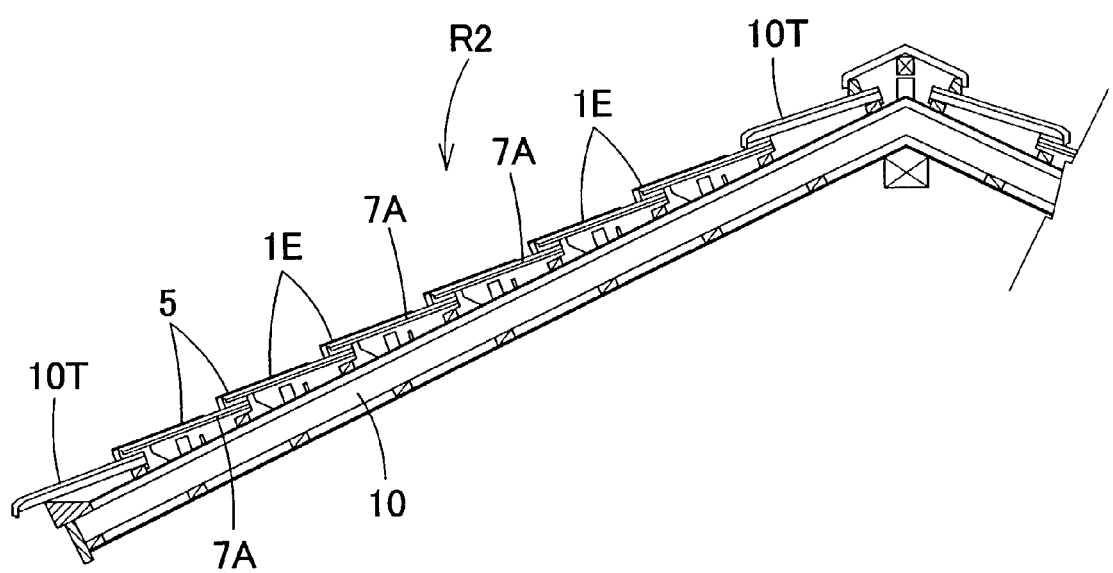
FIG. 27 is an illustration showing a roof equipped with a power-generating function on which solar cell modules of sixth embodiment are arranged together with roof tiles.
Figure 36:
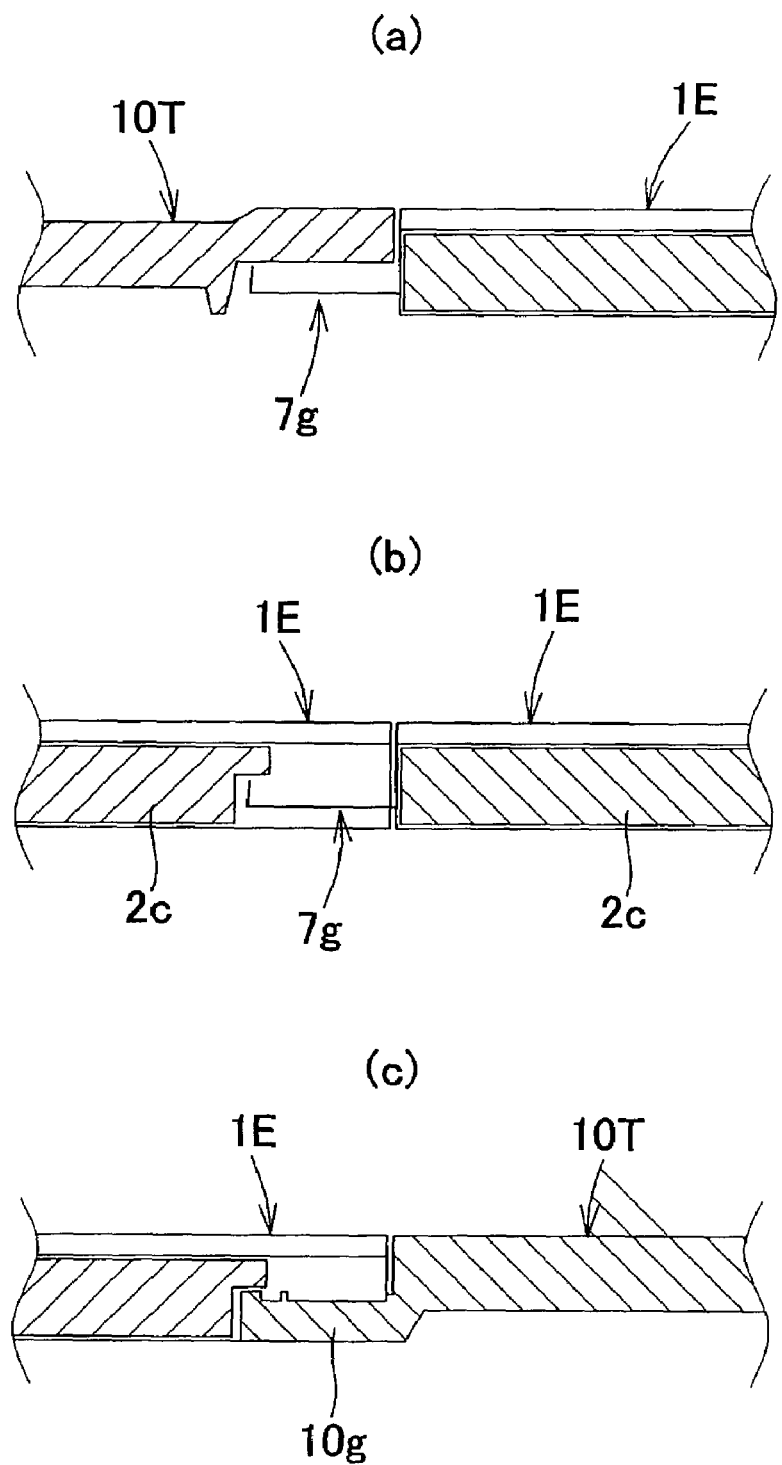
FIG. 36(a) is an illustration showing a state of inserting a tube structure of a solar cell module into a corresponding end of an adjacent roof tile.
FIG. 36(b) is an illustration showing a state of inserting a tube structure into a corresponding end of an adjacent solar cell module.
FIG. 36(c) is an illustration showing a state of inserting the tub portion of a roof tile into a corresponding end of an adjacent solar cell module.
Figure 37:
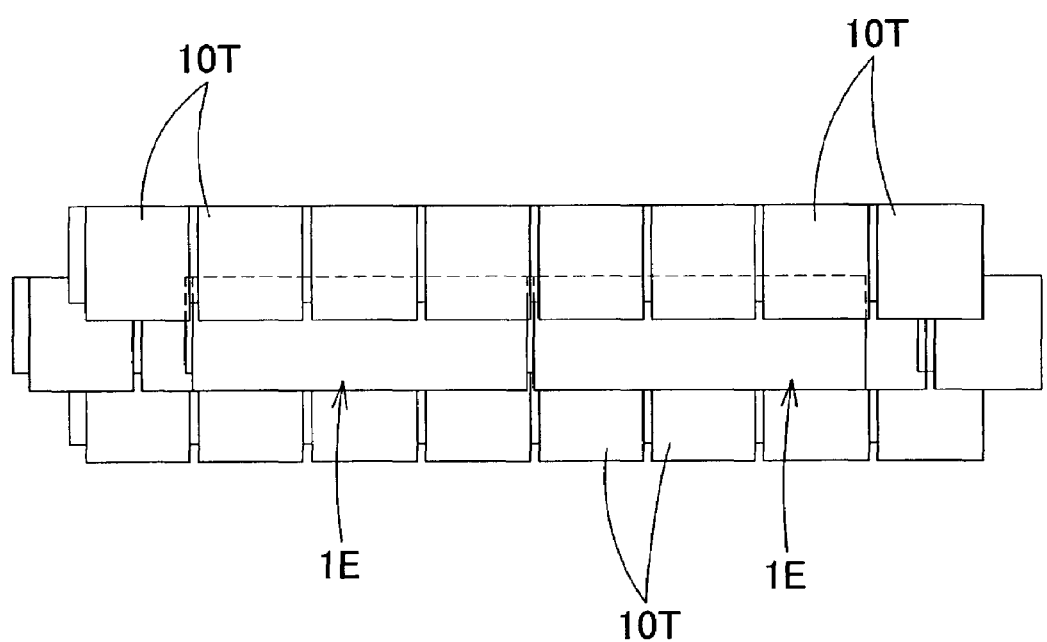
FIG. 37 is an illustration showing a state in which solar cell modules are arranged together with roof tiles.
Figure 38:
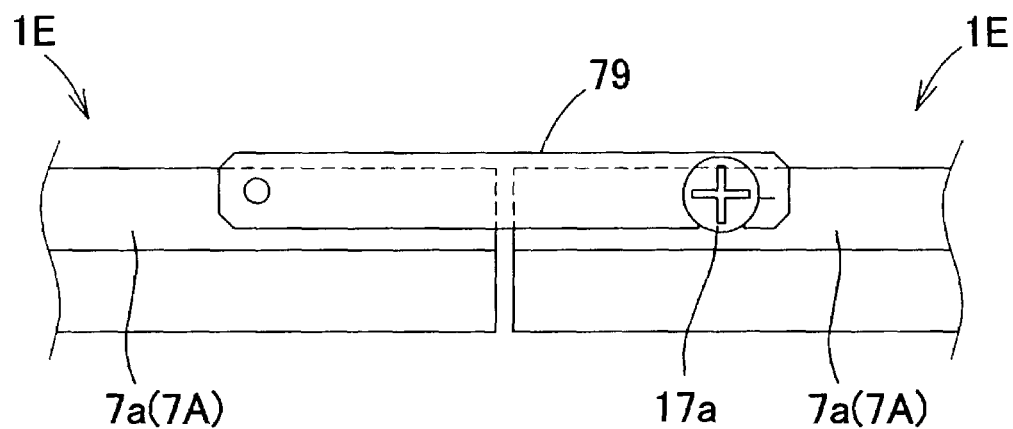
FIG. 38(a) is an illustration showing an essential portion when setting an earth member provided to the ridge-side end of a substrate to an adjacent solar cell module so as to be protruded and FIG. 38(b) is an illustration showing an earth member.
Figure 38:
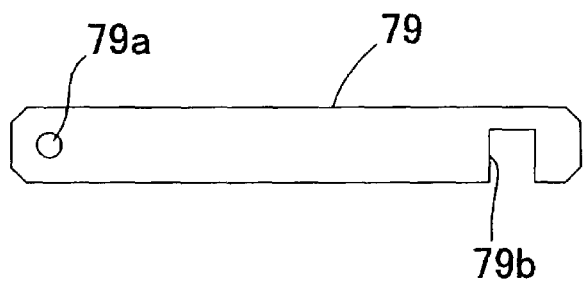
Figure 39:
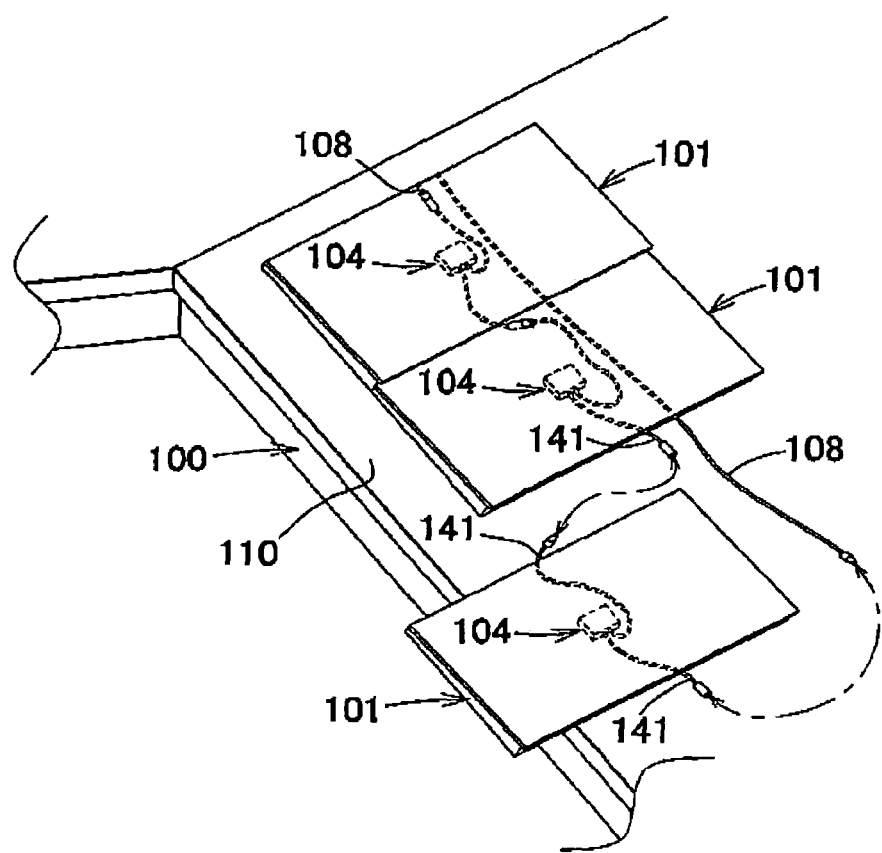
FIG. 39 is an illustration showing a state of arranging conventional solar cell modules on a roof.
Figure 40:
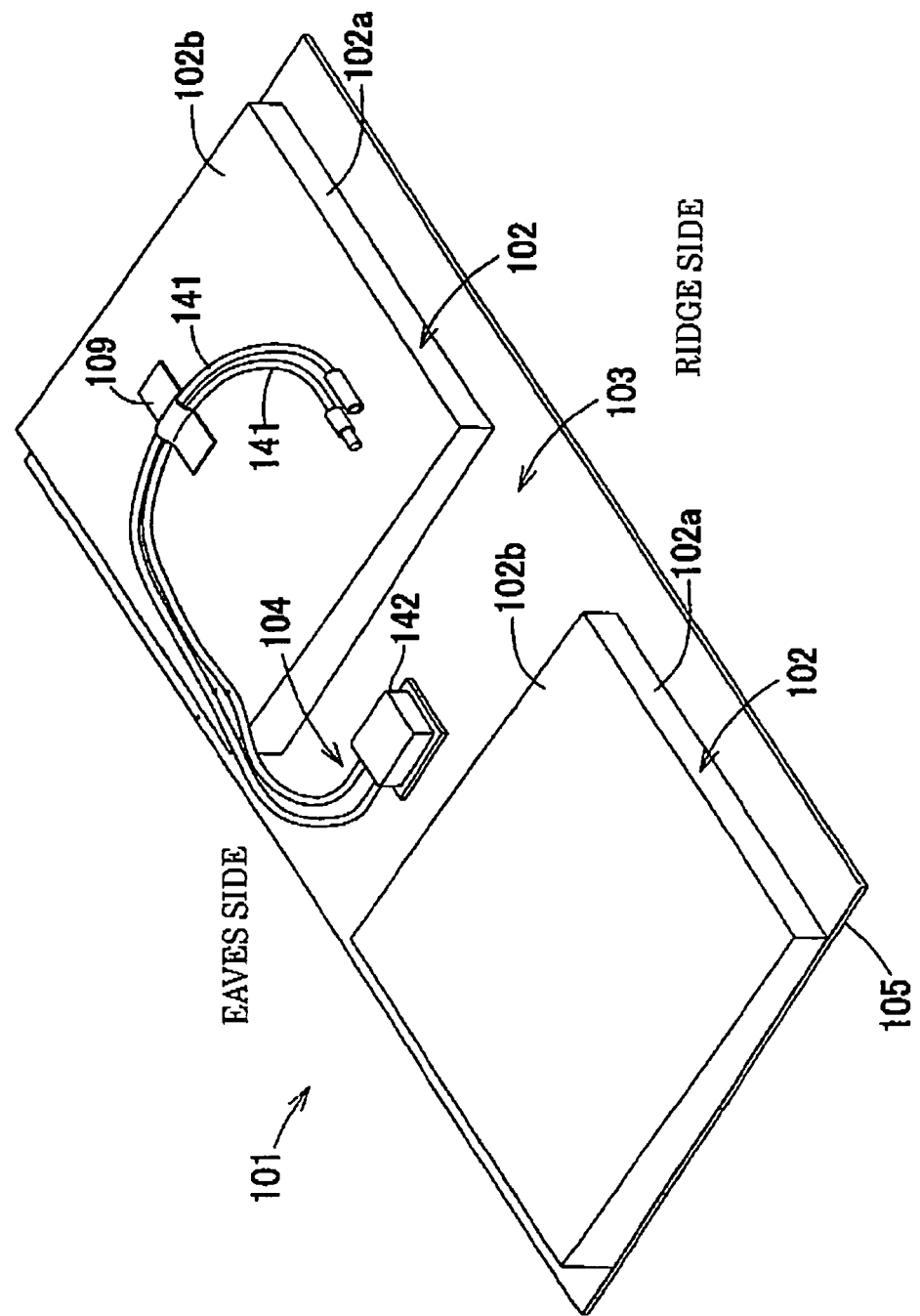
FIG. 40 is a backside perspective view of a solar cell module constituted by fixing an adiabatic support member not having a plurality of legs to the backside.
Figure 41:
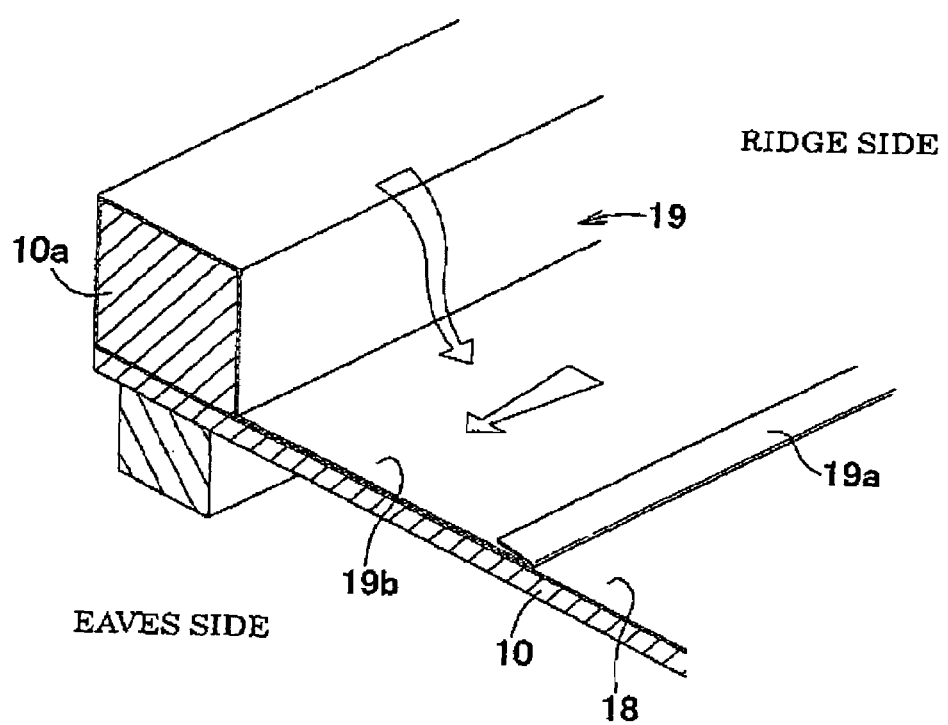
FIG. 41 is an illustration showing a state in which a verge-substrate dewatering eaves discharge rainwater to the eaves side.
Figure 42:
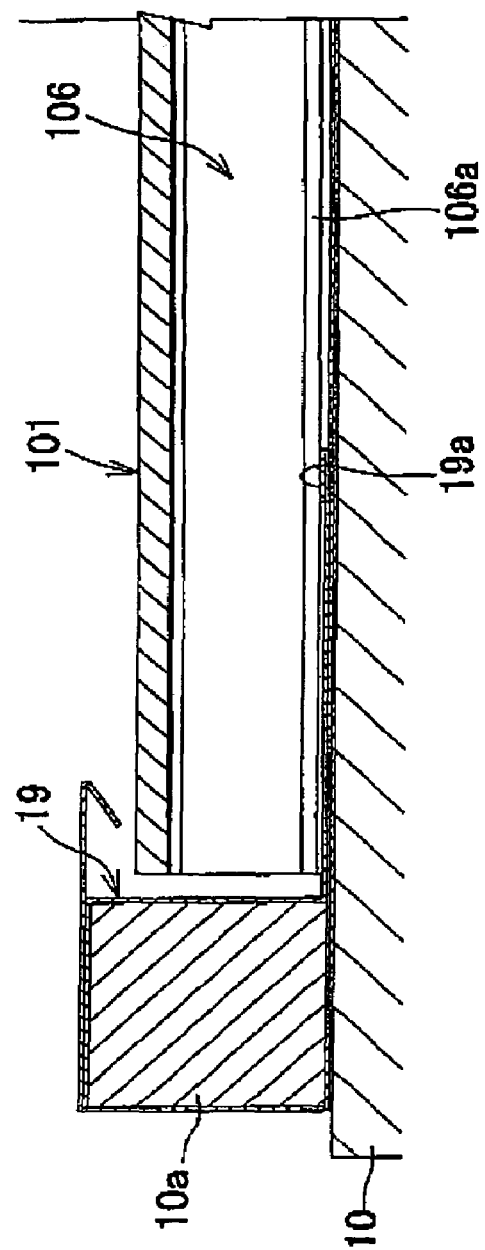
FIG. 42 is an illustration showing a state of setting a conventional solar cell module to the upper side of a verge-substrate dewatering eaves so as to cover them.

Then, sixth embodiment of the present invention is described below by referring to FIGS. 27 to 38. As shown in FIG. 27 or 37, the solar cell module 1E of the present invention is a solar cell module 1E to be disposed on a roof body 10 together with a roof time 10T, which is constituted by fixing a solar cell 5 to the right-receiving side of a substrate 7A, forming a tub structure 7g at the same side as the tub portion 10g of the roof tile 10T as shown in FIGS. 36(a) to 36(c), and fixing the substrate 7A on the roof body 10 by using an area of the substrate in which no solar cell is fixed.

Figure 28:
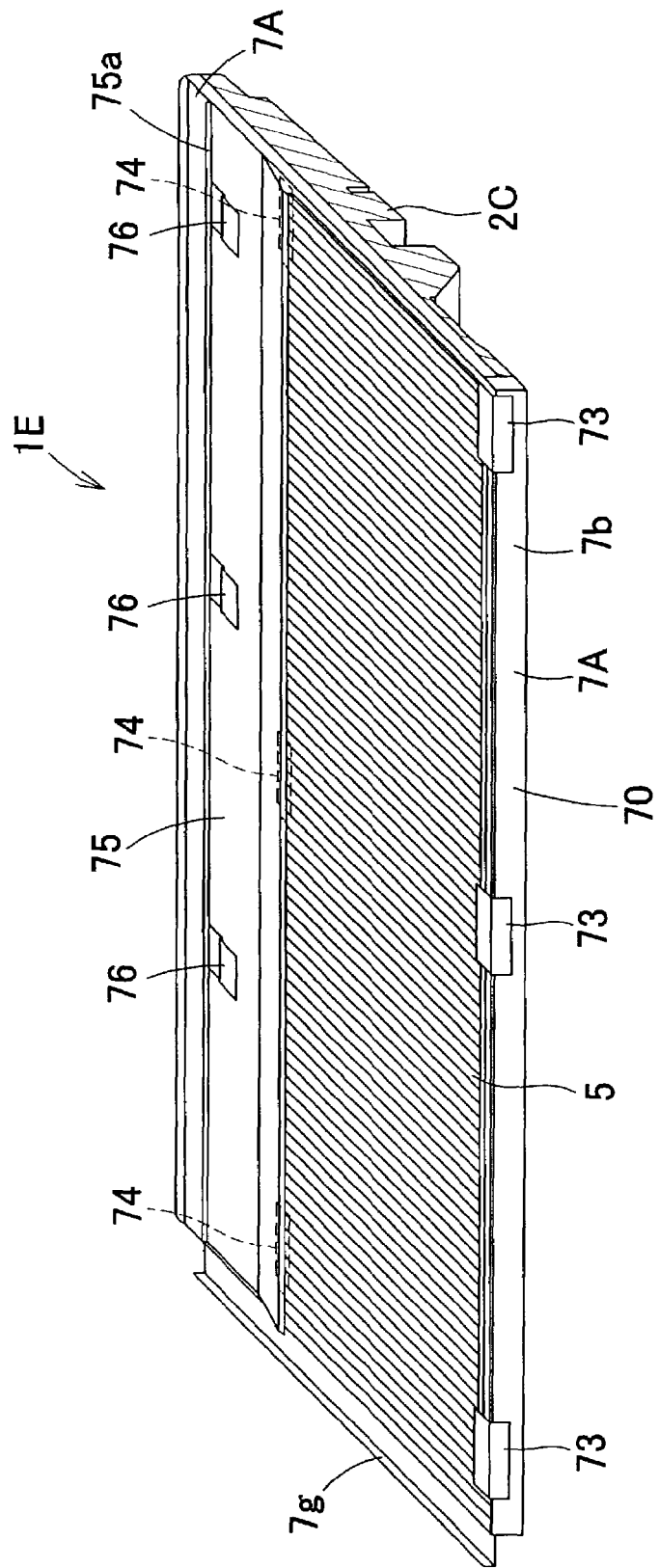
FIG. 28 a perspective view of solar cell modules of the sixth embodiment to be arranged together with roof tiles.

The solar cell 5 is mechanically fixed to the substrate 7A. Specifically, the cell 5 is secured on the substrate 7A by securing clamps 73 and 74 set to the substrate 7A. As shown in FIG. 28, the substrate 7A has a strong structure formed like a box by bending an end of a metallic plate through sheet metal working and the above tub structure 7g is also formed by bending the end.

Figure 29:
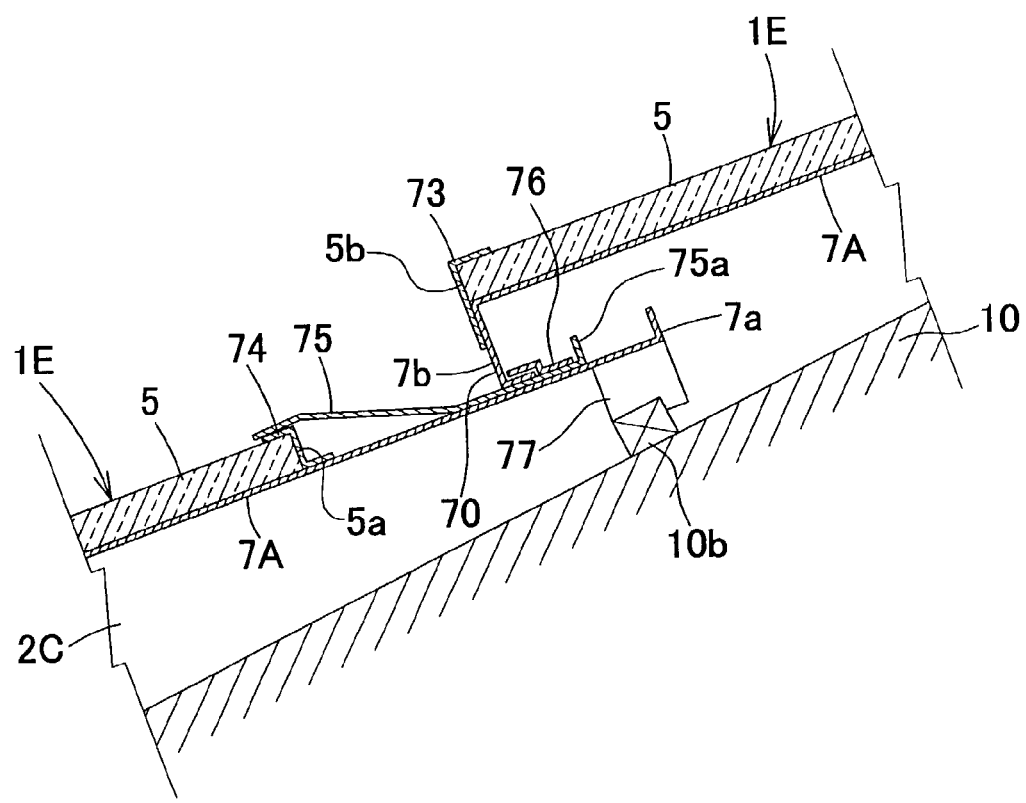
FIG. 29 is an illustration of an essential portion of a solar cell module to be step-disposed in the vertical direction of a roof.

As shown in FIG. 29, the eaves-side margin 5b of the solar cell 5 is secured by a plurality of clamps 73, . . . provided to the eaves-side end 7b of the substrate 7A.

The cross section of the clamp 73 is formed like an L shape so as to be engaged with the margin 5b of the solar cell 5 and fixed to a connective portion 70 formed by bending an end of a substrate by a screw or blind rivet (hereafter abbreviated to "rivet"). The connective portion 70 constitutes the eaves side leg portion of the solar cell module 1E and is fixed on the substrate protruding to the ridge side of the solar cell module 1E previously set to the eaves side of the roof body 10 to connect the solar cell modules 1E and 1E to each other.

The ridge-side margin 5a of the solar cell 5 is secured by a plurality of clamps 74, . . . provided to the eaves-side middle portion of the substrate 7A. In the case of the solar cell module 1E of this embodiment, the solar cell 5 is fixed to the substrate 7A by using the total of six clamps such as three clamps 73 for securing the eaves-side margin 5b and three clamps 74 for securing the ridge-side margin 5a. The number, shapes, and dimensions of these clamps are properly set in accordance with the shape or the like of a solar call.

Moreover, a cover member 75 extending over the width-directional whole area of the solar cell 5 is provided to the ridge-side margin 5a of the solar cell 5 fixed by the clamp 74 along the portion. The cover member 75 extends to the ridge side on the substrate 7A from the vicinity of the margin of the substrate 7A protruding to the ridge side of the solar cell 5 and moderately rises toward the upper portion of the ridge-side margin 5a of the solar cell 5 by being bent at its middle portion so as to cover the ridge-side margin 5a and the clamp 74, . . . securing the margin 5a on the substrate 7A by the end of the member 75. Rainwater flowing from a ridge-side solar cell module is led to the upper face of an eaves-side solar cell module 1E and it is prevented that the rainwater leaks from the ridge-side margin 5a or a screw-secured or rivet-secured portion of the clamp 74 by the cover member 75.

Moreover, a plurality of clamps 76, . . . for fixing the connective portion 70 constituting the eaves-side leg portion of the solar cell module 1E are provided to the cover member 75. Therefore, when stepwise arranging other solar cell module adjacently to the ridge side, the module is connected onto the substrate 7A through the cover member 75 by engaging the connective portion 70 with the clamp 76, . . . The cross section of the clamp 76 is a clamp formed like a Z shape and fixed on the cover member 75 by a screw or rivet.

Moreover, a plurality of clamps 76, . . . for fixing the connective portion 70 constituting the ridge-side leg portion of the solar cell module 1E are provided to the cover member 75. Therefore, when stepwise arranging other solar cell module adjacently to the ridge side, the module is connected onto the substrate 7A through the cover member 75 by engaging the connective portion 70 with the fixing members 76, . . . . The cross section of the clamp 76 is a clamp formed like a Z shape and fixed on the cover member 75 by a screw or rivet.

Figure 30:
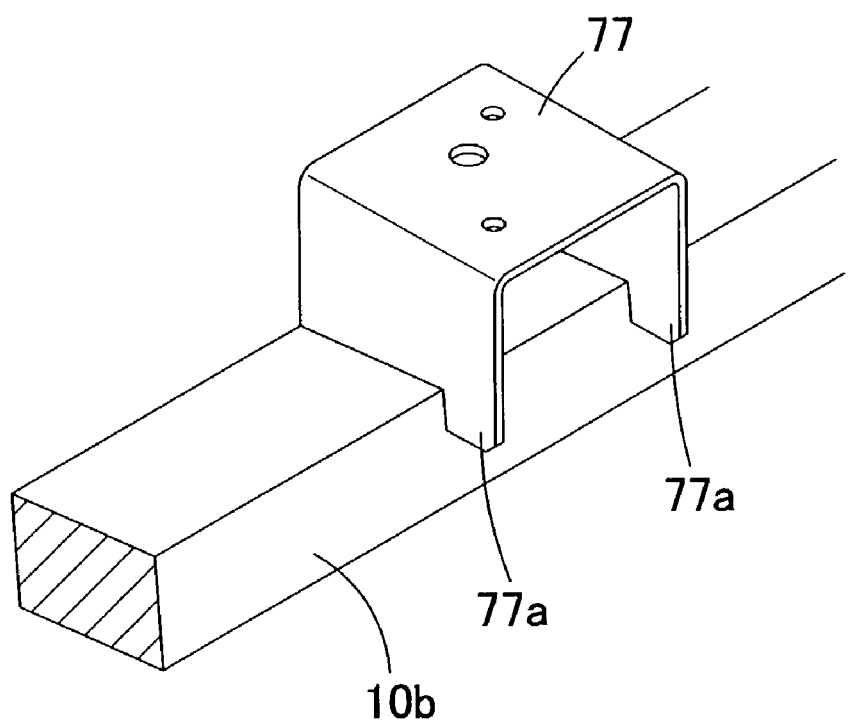
FIG. 30 is an illustration showing a leg for securing a solar cell module to a stand tree.

A leg member 77 to be secured to a roof-tile stand tree 10b on the roof body when fixing the solar cell module 1E onto the roof body 10 is provided to the ridge-side end 7a of the substrate 7A. As shown in FIG. 30, the leg member 77 is a metallic hardware formed by bending a zinc-plated steel plate having a thickness of approx. 1.6 mm like a U shape and securing portions 77a and 77a to be secured by a roof-tile stand tree are provided to the sidewall end of the leg member 77.

Figure 31:
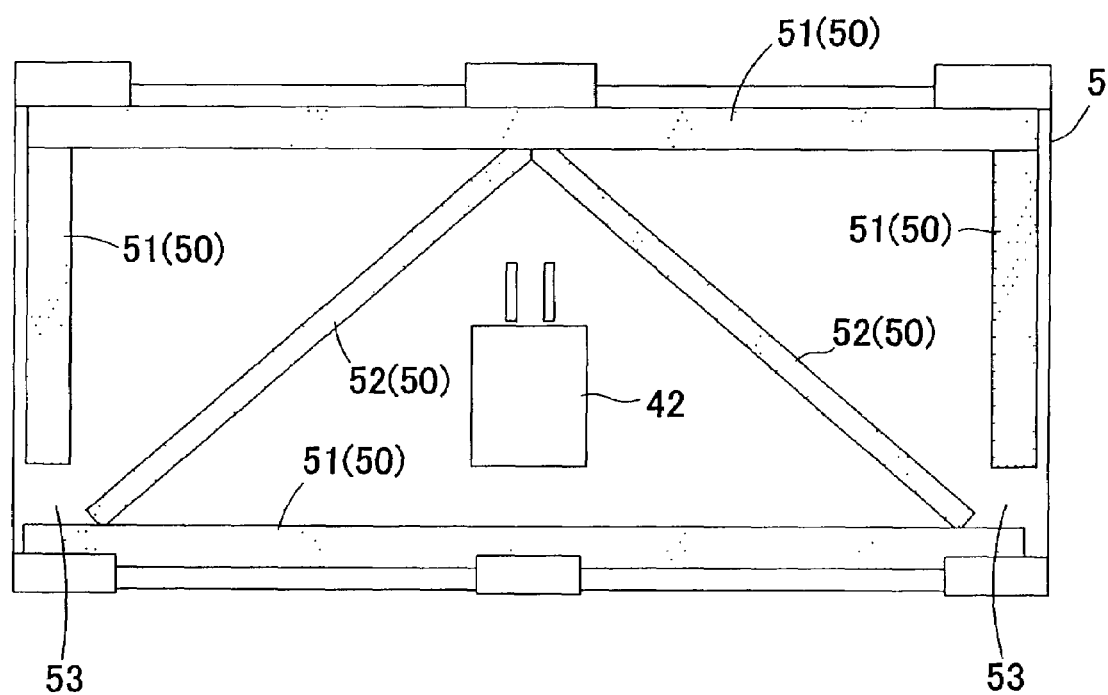
FIG. 31 is an illustration showing a water-stop structure formed on the gap between a solar cell and a substrate.
Figure 32:
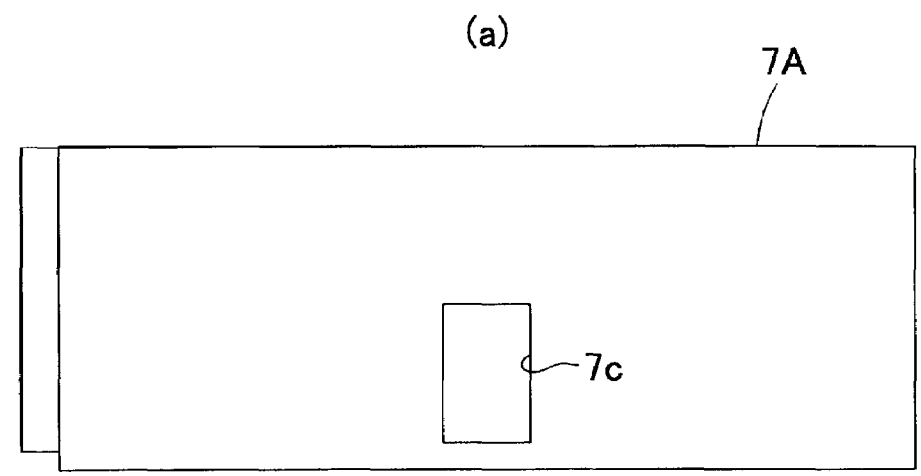
FIG. 32(a) is an illustration showing a substrate having an opening and FIGS. 32(b) and 32(c) are illustrations showing a tub member for covering the opening.
Figure 32:
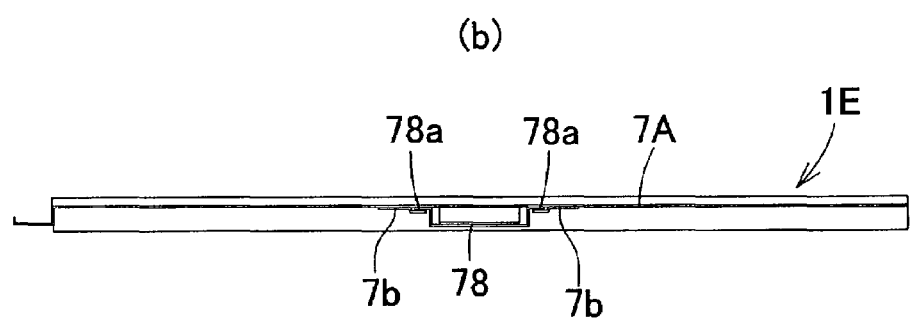
Figure 32:
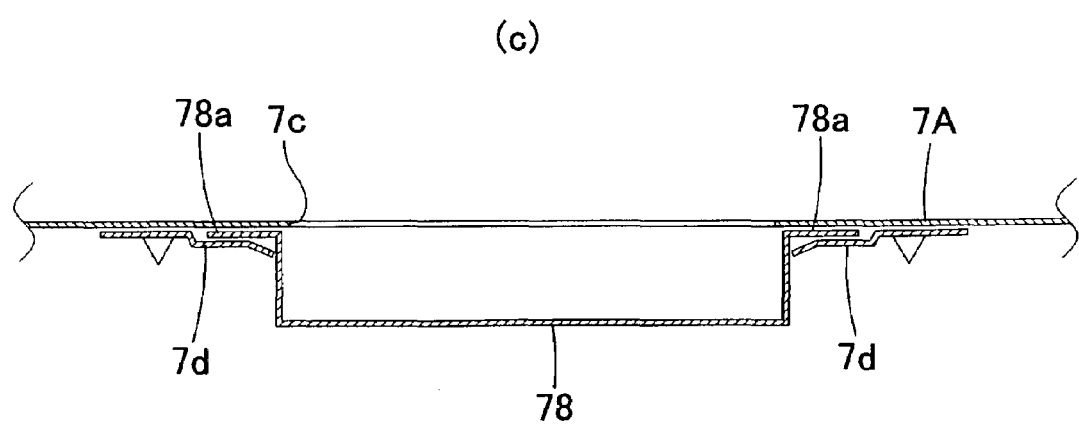

An elastic sealing member having a thickness of 3 mm or more is attached to the back of the solar cell 5 or the margin and a portion present inward of the back of the solar cell 5 on the upper face of the substrate 7A facing the back of the solar cell 5 and the water stop structure in the gap between the solar cell 5 and substrate 7A is formed by the sealing member. Specifically, as shown in FIG. 31, a sealing member 50 made of expanded EPDM or the like is previously attached to the margin and its inward portion of the back of the solar cell 5 at a thickness of 3 mm or more and a thickness at which the sealing member 50 is compressed to 2 mm or less when fixing the solar cell 5 onto the substrate, preferably a thickness of approx. 5 to 6 mm and thereby, a water stop structure is formed in which even if rainwater comes inward from the margin, it does not come up to at least a terminal box and an opening 7c to be described later passing through the terminal box. More minutely, the sealing member 50 forms a circumferential waterproof portion 51 attached along the margin of the back of the solar cell 5 and a discharge guide portion 52 diagonally extending from the central portion of the ridge side of the portion 51 toward the both sides of each eaves side and the terminal box 42 is completely enclosed by the discharge guide portion 52 and eaves-side waterproof portion 51. Moreover, an opened drainage port 53 provided with no sealing member is formed at the both sides of the eaves side. Therefore, even if rainwater enters from the ridge side, the drainwater is guided to the both sides of the eaves side by the discharge guide portion and quickly discharged from the drainage port 53 without reaching the terminal box 42 and the gap between the solar cell 5 and the substrate is always kept almost dry.

As shown in FIG. 32(a), an opening 7c passing through the terminal box 42 of the solar cell 5 and its output cable to be protruded to the backside of the module is provided to a portion facing the terminal box 42 and an almost-U-shaped tub member 78 is removably provided to the backside of the substrate 7A so as to cover the opening 7c. The tub member 78 is extended at least up to a position capable of discharging water onto the substrate of a solar cell module set adjacently to the eaves side. Therefore, the member 78 is constituted so that even if rainwater comes in from the opening 7c, it is discharged to the upper face of the module at the eaves side. As shown in FIGS. 32(b) and 32(c), securing pieces 78a and 78a are protruded outward at the upper end of the sidewall of the tub member 78, support pieces 7d and 7d are fixed by rivets from the upper side of the substrate 7A, and thereby, the tub member 78 is removably supported in the vertical direction of the roof in accordance with the insertion method.

Figure 33:
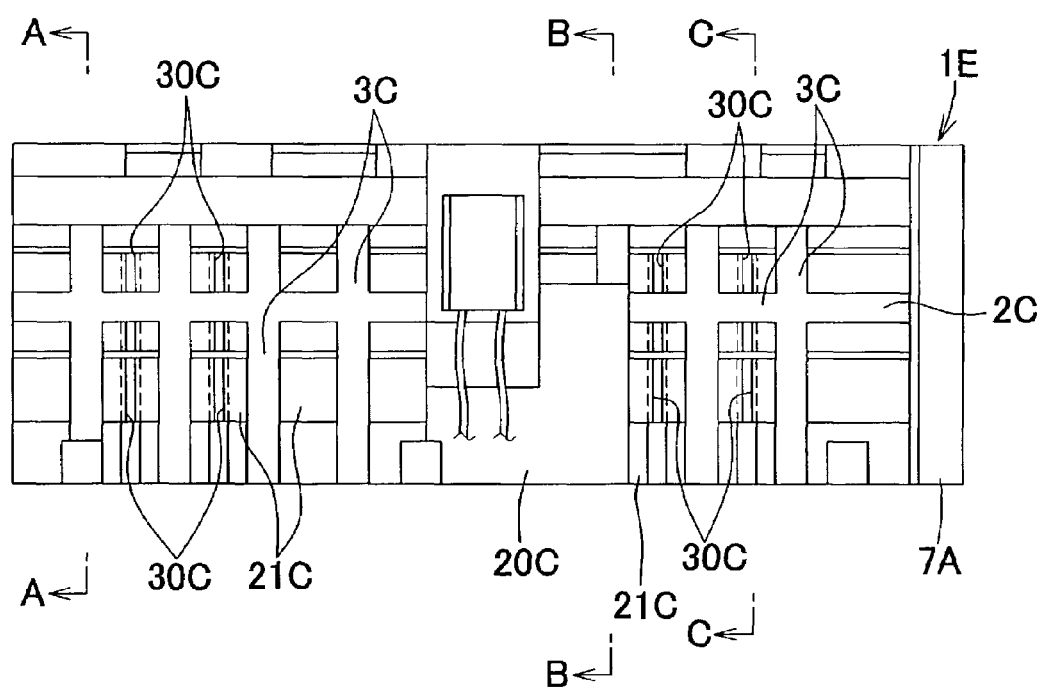
FIG. 33 is a top view showing an adiabatic support member provided to the back of a substrate.
Figure 34:
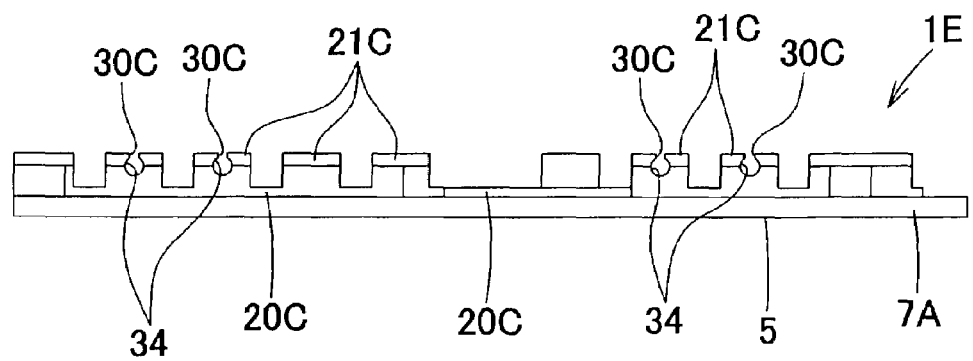
FIG. 34 is a front view of the adiabatic support member in FIG. 33.
Figure 35:
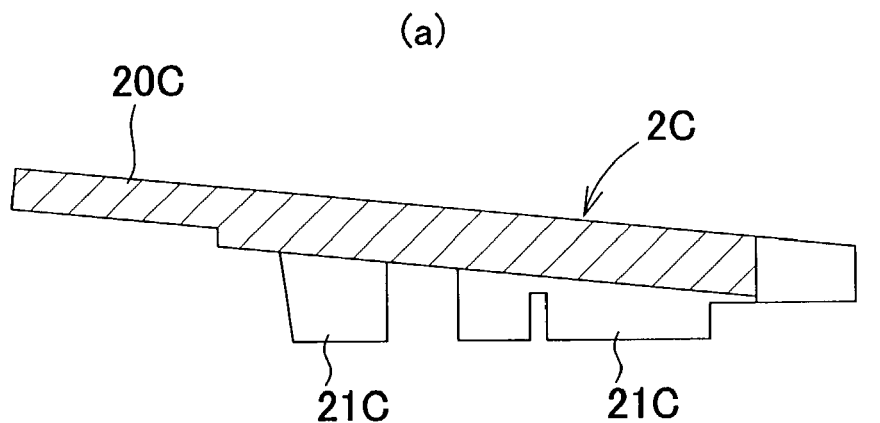
FIG. 35(a) is an A—A sectional view of the adiabatic support member in FIG. 33.
FIG. 35(b) is a B—B sectional view of the member in FIG. 33.
FIG. 35(c) is a C—C sectional view of the member in FIG. 33.
Figure 35:
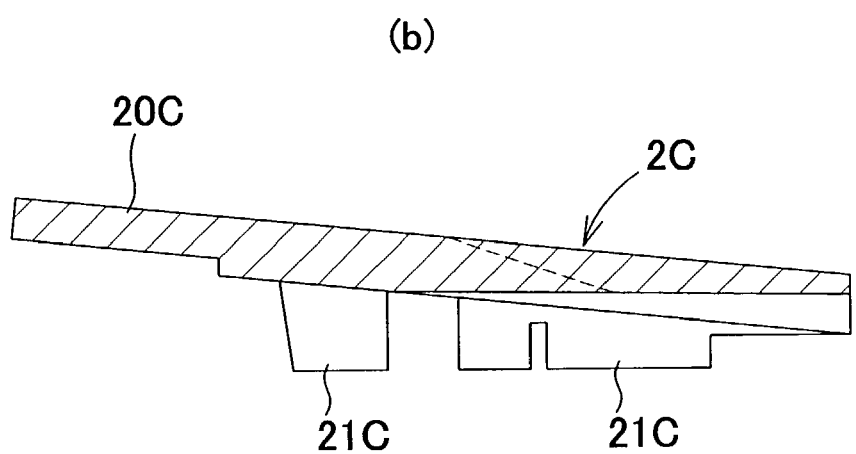
Figure 35:
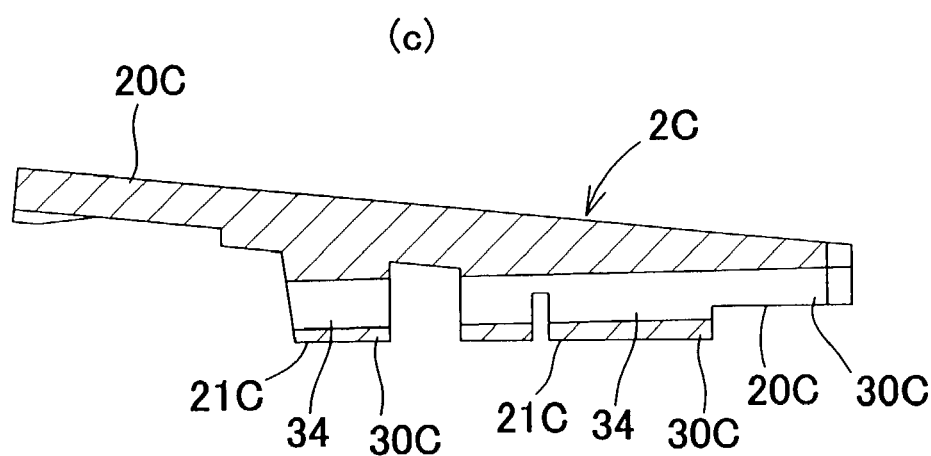

Moreover, as shown in FIGS. 33 and 34, a back-receiving adiabatic support member 2C contacting the surface of the roof body is provided to the backside of the substrate 7A and a cable-holding groove 30C for wiring is formed on the contact face of the adiabatic support member 2C to the roof body.

Specifically, the adiabatic support member 2C is constituted by a flat body portion 20C face-fixed to the backside of a solar cell and a plurality of legs 21C, . . . independent each other vertically arranged at the roof body and a drain ditch 3C is inevitably formed on gaps between these legs. This embodiment is constituted so that the cable-holding groove 30C is formed on one or more legs 21C and moreover, the cable-holding groove 30C is formed on the flat body portion 20C on the extension line of the legs 21C as shown in FIG. 35(c) so as to communicate with the portion 20C, and a held drawing cable and the like can be vertically disposed exceeding the above roof-time stand tree 10b.

The cable-holding groove 30C houses and holds a cable to be wired the same as that of the above embodiment, in which a wide housing space 34 cut out by heat waves is formed so that one or more cables having various shapes and thicknesses including an output cable to be extended from the terminal box 42 and a trunk cable to be disposed on the roof body can be held.

However, when setting the opening width of the cable-holding groove 30C to a too large value in order to house and hold a thick cable such as a trunk cable, a case may occur in which a comparatively thin cable such as an output cable cannot be held. Even in this case, it is possible to easily avoid missing by holding a thick cable such as a drawing cable from the top of a thin cable and moreover, stably hold even a single thin cable by forming a cable-holding groove into a bent zigzag groove in its top view.

Moreover, when constituting the roof R2 equipped with a power-generating function by arranging the solar cell modules 1E together with roof tiles 10T, the portion of the tub structure 7g protruded to the lateral side is inserted into a corresponding end of the adjacent roof tile 10T or solar cell module 1E as shown in FIGS. 36(a) and 36(b), the tub portion 10g of the roof tile 10T adjacent to the opposite side is accepted and successively arranged as shown in FIG. 36(c), and rainwater and the like incoming from the gap between the both adjacent to each other are discharged to the lower portion of the roof by the tub structure 7g and tub portion 10g.

In general, roof tiles are arranged from the right of the frontage of a house to the left of it toward the roof and then, upper-stage roof tiles to be put on the former roof tiles are zigzag arranged so that positions of the tub portions 10g are not vertically overlapped and then successively arranged in the ridge-side direction. The reason for preventing tub portions 10g from vertically overlapping is to prevent rainwater to be discharged from being concentrated and moreover, there is a reason that it is preferable to zigzag arrange roof tiles from the viewpoint of design. The above circumstances are also applied to the case of mix-arranging solar cell modules like this embodiment. The dimension of the solar cell module 1E is set correspondingly to the roof tile 10T so that the waterproof function can be maintained by keeping the zigzag positional relation with a roof tile adjacent to the eaves side or ridge side, equalizing relative positional relations between right and left joints, keeping the harmony on design, and preventing rainwater from being concentrated.

As shown in FIG. 38(a), an earth member 79 for grounding to be electrically connected to the substrate 7A of the solar cell modules 1E to be adjacently arranged at right and left and a screw 17a for electrical connection are provided to the ridge-side end 7a of the substrate 7A. As shown in FIG. 38(b), the earth member 79 is made of a metallic flat structural material, and a rive hole 79a to be rivet-fixed to the substrate end 7a of the solar cell module 1E to be previously set and an release hole 79b to be screw-fixed to the screw 17a of the substrate end 7a of another solar cell module are formed at the longitudinal-directional both ends of the earth member 79 respectively. It is preferable that the solar cell 5 is amorphous or hybrid.

INDUSTRIAL APPLICABILITY

In the case of a solar cell module of the present invention, a bottomed drain ditch opening at the contact face of an adiabatic support member to a roof body is formed so as to communicate with the lateral side of the adiabatic support member. Therefore, rainwater and the like entering the backside are quickly discharged to the eaves side, a trouble such as water leakage or the like is solved, the air permeability is improved, and the moisture of the backside of the module is smoothly discharged. Moreover, only by inserting an output cable extended to the backside along a drain ditch, it is possible to temporarily fix the module to the backside of a solar cell without separately using an adhesive tape or the like.

When forming two or more of the above drain ditch so as to vertically and horizontally cross each other, the above drainage performance and air permeability are further improved, and it is possible to insert an output cable by greatly bending it horizontally and vertically at the confluence portion of drain ditches and securely hold he cable by the inside of a drain ditch.

When setting the depth of a drain ditch to a value at least larger than the outside diameter of an output cable, the inserted output cable is completely housed in the ditch without protruding outward from the opening of the drain ditch and the easiness of packaging for shipping and the easiness of management that solar cell modules can be stably vertically overlapped without damaging them are improved.

When forming a part or the whole of a drain ditch into a bottomed shape, an output cable is securely held in the drain ditch.

When forming a constricted portion having a width approximately equal to the outside diameter of an output cable on a part of a drain ditch along its longitudinal direction, the output cable is securely and stably held in the drain ditch.

Moreover, in the case of a solar cell module constituted by constituting an adiabatic support member by a flat body portion face-fixed to the backside of a solar cell and a plurality of legs independent each other vertically disposed to a roof body from the flat body portion and forming a cable-holding groove opening on the contact face to the roof body, having a depth larger than a cable diameter, and holding the inserted cable while housing it without protruding it from the opening on at least one leg selected out of the above legs so as to communicate with the leg lateral side, rainwater and the like entering the backside of the module is quickly discharged without staying on the wall of the ridge side or the contact face with the roof body, a problem of water leakage is solved, the air permeability is improved, and the moisture of the backside of the module is smoothly discharged. Moreover, it is possible to temporarily fix the output cable to the backside of the solar cell simply and securely without separately using an adhesive tape or the like. Furthermore, by holding the output cable with the cable-holding groove, it is prevented that the output cable is held between the adiabatic support members, the working efficiency for execution is improved, bleed of the output cable after execution is prevented, and long-term reliability and stable power-generating capacity are maintained.

In this case, when an adiabatic support member is made of an elastic body and a cable-holding groove holds an inserted cable by a portion narrower than the cable diameter, the cable can be easily inserted into the cable-holding groove and the inserted cable is stably held.

When forming a cable-holding groove like a taper so that the width of the groove slowly decreases from the opening toward the bottom, the operability for inserting a cable is improved.

When forming a wide housing space cut out by heat waves in a cable-holding groove, it is possible to hold one or more cables having various shapes and sizes.

When forming a cable-holding groove into a zigzag groove bent in its top view, an inserted cable is securely friction-held by the inner wall of the bent groove and therefore, it is possible to hold even a thin cable independently.

When forming a cable-holding groove to legs arranged at least nearby an output-cable extending position of an adiabatic support member to the outside of a module, it is possible to avoid an unexpected trouble that an output cable enters the backside of a solar cell module again after fixing the solar cell module and securely float the connector of the connected cable from a substrate sheet.

Moreover, in the case of a building-material-integrated solar cell module in which the thickness of the module is set so that when arranging a plurality of geta members at the bottom of the above support table facing a roof body and disposing the solar cell module to the upper side of a verge-substrate dewatering eaves of the roof body so as to cover the eaves, the bottom of a support table floated by the geta members does not crush the bent portion of the verge-substrate dewatering eaves, rainwater can be smoothly discharged through the water channel of the verge-substrate dewatering eaves without crushing the bent portion for stopping rainwater even when setting the solar cell module to the upper side of the verge-substrate dewatering eaves on the roof body so as to cover the dewatering eaves, a trouble of the solar cell module due to the water leaking to the indoor side or the staying moisture is prevented, and the power-generating capacity and reliability can be maintained for a long time.

The thickness of a geta member is preferably set to 4 to 5 mm by considering the height of the bent portion of a general verge-substrate dewatering eaves. Particularly, when setting the geta member to a position for covering the opening of a screw hole drilled at the bottom of a support table if the support table is fixed to the roof body with the geta member by screws or rails, the geta member functions as a waterproof sealing member to be closely contacted with the bottom of the support table, screw hole, and the substrate sheet of a roof body and caulking of a fixed portion can be omitted which have been necessary so far for execution.

When forming a thick-wall portion on a geta member through a step and forming the opening of a screw hole on the thick-wall portion, and fixing a support table to a roof body, the waterproof sealing performance is further improved because the thick-wall portion is contact-bonded to the roof body to increase the face pressure of the portion.

It is preferable that a geta member is made of EPDM (ethylene-propylene-diene copolymer) or chloroprene and has a JISA hardness of 50 to 70.

It is preferable that each of the above geta members is a contour-extrusion molded product. Particularly, in the case of a building-material-integrated solar cell module to be successively arranged on a roof body by fitting the end of a solar cell to another support table already fixed onto the roof body, in which front ends of bottoms of geta members in the above fitting direction are formed into smooth faces, each geta member smoothly moves on a substrate sheet without being removed from a support table and the ridge-side end of the solar cell module is smoothly fitted into the other support table and the execution efficiency is prevented from deteriorating. In this case, a solar cell module is preferable in which a one-side adhesive tape whose surface is waxed is attached to the front end of a geta member and moreover the remaining portion is attached to the support table.

In the case of a roof equipped with a power-generating function constituted by arranging solar cell modules in which the above geta members are disposed at the bottom of the support table on a roof body, the waterproof function of a verge-substrate dewatering eaves is maintained, a trouble of a solar cell module due to the water leaked to the indoor side or remaining moisture is prevented, and the power-generating capacity and reliability can be maintained for a long time.

Moreover, particularly in the case of a solar cell module to be set on a roof body together with a roof tile, in which a solar cell is fixed to the light-receiving side of a substrate made of a non-combustible material, a tub structure is formed on the substrate at the same side as the tub portion of the roof tile, and the substrate is fixed onto the roof body by using an area of the substrate in which no solar cell is fixed, it is possible to prevent a cable from being held even when arranging the solar cell module together with the roof tile and therefore, the working efficiency is improved.

When securing the eaves-side margin of a solar cell to a plurality of clamps provided to the eaves-side end of a substrate, a solar cell module is provided which is superior in maintainability, prevents the cost from rising, and is inexpensive and lightweight.

When providing a plurality of clamps for fixing a connective portion constituting a leg portion of the eaves side of a solar cell module to the above cover member and stepwise disposing another solar cell module adjacently to the eaves side, it is preferable for execution that the module is connected onto a substrate through the cover member and the waterproof performance is also maintained by engaging the connective portion with the clamps.

When providing a plurality of clamps for fixing a connective portion constituting a leg portion of the ridge side of a solar cell module to the above cover member and stepwise disposing another solar cell module adjacently to the ridge side, it is preferable for execution that the module is connected onto a substrate through the cover member and the waterproof performance is also maintained by engaging the connective portion with the fixing members.

When attaching an elastic sealing member having a proper thickness of 3 mm or more to the back of a solar cell or the margin and an inner portion of the back of the solar cell on the upper face of a substrate facing the back of the solar cell and forming a water stop structure between the solar cell and the substrate by the sealing member, it is possible to keep the gap between the solar cell and the substrate in an almost dry state.

When forming an opening for protruding a terminal box to the back of a module on a portion of the above solar cell on the substrate facing the terminal box of the solar cell and removably providing a tub member for covering the opening to the backside of the substrate, it is possible to discharge rainwater to the upper face of a eaves-side module even if the rainwater comes in from the opening.

It is preferable to provide a leg to be secured by a roof-tile stand tree on a roof body to a substrate when fixing a solar cell module onto the roof body.

When constituting an adiabatic support member by a flat body portion face-fixed to the backside of a solar cell and a plurality of legs independent each other vertically set to a roof body and forming a cable-holding groove to one or more legs, and also forming a cable-holding groove on a flat body portion on the extension line of the legs so as to communicate with the flat body portion, it is simplified to vertically dispose a drawing cable held for execution and the like exceeding a roof-tile stand tree.

It is preferable to provide an earth member for grounding to be electrically connected to the substrate of solar cell modules adjacently arranged at right and left and a screw for electrical connection to the ridge-side end of a substrate. It is preferable that the above solar cells are amorphous or hybrid.

In the case of a roof equipped with a power-generating function constituted by arranging the above solar cell modules constituting a tub structure on a roof body together with roof tiles, the solar cell modules respectively have characteristics as a roof-covering member superior in rain-storm resistance and fire resistance and are lightweight, and an output cable is prevented from being held between adiabatic support members. Therefore, the execution performance is improved and it is possible to easily replace only solar cells by removing screws or rivets of the clamp closer to the eaves of a purposed module without moving circumferential solar cell modules or roof tiles after execution.

Moreover, in the case of a roof equipped with a power-generating function constituted by arranging the above solar cell modules of the present invention along the surface of a roof body to introduced the power generated by the modules to the inside of a house through a cable from the apex of the roof, characterized in that a sleeve for guiding the cable to the indoor side by passing the cable through the apex of the roof is used and the sleeve is provided with a cable entrance opening at the surface side of the roof body on which the solar cell modules are arranged and a cable exit opening at the surface side or indoor side of another roof body adjacent to the former roof body by using the ridge portion of the roof as a boundary on which an insertion hole communicating with the indoor side is formed, it is possible to smoothly extend the cable guided into the sleeve on the roof without resistance and more effectively prevent water from leaking from the sleeve set portion because the cable exit introduced to the indoor side opens at the surface side or indoor side nearby the insertion hole formed on another roof body, that is, opens at the roof body at the backside of a conventional roof member where no solar cell module is set.

What is claimed is:

1. A solar cell module comprising a solar cell constituting a roof member, an output cable extended from the backside of the solar cell, and an adiabatic support member contacting the surface of a roof body fixed to the backside of the solar cell, wherein a plurality of drain ditches opening at the contact face of the adiabatic support member to the roof body is provided so as to communicate with a lateral side of the adiabatic support member, and wherein said drain ditches are formed so as to cross each other vertically and horizontally, and wherein the output cable is inserted along at least one of the drain ditches, and wherein the depth of a drain ditch is set to a value at least larger than the outside diameter of the output cable.

2. The solar cell module according to claim 1, wherein a part or the whole of a drain ditch is formed into a bottom-flared shape.

3. The solar cell module according to claim 1, wherein a constricted portion having a width approximately equal to the outside diameter of an output cable is formed on a part of a drain ditch along its longitudinal direction.

4. The solar cell module according to claim 1, in which the adiabatic support member is constituted by a flat body portion face-fixed to the backside of a solar cell and a plurality of legs independent each other vertically set to a roof body from the flat body portion and the drain ditch is formed by the gap between the legs, wherein a cable-holding groove opening at the contact face to the roof body, having a depth larger than a cable diameter, and holding an inserted cable while housing the cable without protruding it from the opening is formed on at least one leg selected out of the legs so as to communicate with the lateral side of the at least one leg.

5. The solar cell module according to claim 4, wherein the adiabatic support member is constituted by an elastic body and a cable-holding groove elastically holds an inserted cable by a portion having a width smaller than a cable diameter.

6. The solar cell module according to claim 4, wherein the cable-holding groove is formed like a taper so that the width of the groove becomes gradually smaller from the opening toward the bottom.

7. The solar cell module according to claim 4, wherein the cable-holding groove is formed by a groove opening along a direction selected out of vertical, horizontal, diagonal, and moderately-curved directions or a combination of these grooves.

8. The solar cell module according to claim 4, wherein a wide housing space cut out by heat waves is formed in the cable-holding groove.

9. The solar cell module according to claim 4, wherein the cable-holding groove is formed into a zigzag groove bent in its top view.

10. The solar cell module according to claim 4, wherein a cable-holding groove is formed at least on the at least one leg located nearby an output-cable extending position of the adiabatic support member to the outside of the module.

11. The solar cell module according to claim 4, wherein the output cable is guided along the periphery of the at least one leg disposed nearby the proximal end of the output cable without forming a cable-holding groove on the at least one leg.

12. The solar cell module according to claim 1, wherein the adiabatic support member is made of an expanded synthetic resin.

13. The solar cell module according to claim 1, provided with a support table for supporting the solar cell module and fixing the solar cell module to the roof body and constituted into a building-material-integrated solar cell module, wherein a plurality of geta members are arranged at the bottom of the support table facing the roof body and the thickness of each geta member is set so that when setting the solar cell module to the upper side of a verge-substrate dewatering eaves as so to cover the dewatering eaves, the bottom of the support table floated by the geta members does not crush a bent portion of the verge-substrate dewatering eaves.

14. The solar cell module according to claim 13, wherein the thickness of each geta member is set to 4 to 5 mm.

15. The solar cell module according to claim 13, wherein each geta member is set to a position for covering the opening of a screw hole drilled on the bottom of the support table.

16. The solar cell module according to claim 15, wherein a thick-wall portion is formed on each geta member through a step and the opening of the screw hole is located to the thick-wall portion.

17. The solar cell module according to claim 13, wherein each geta member is made of EPDM or chloroprene.

18. The solar cell module according to claim 13, wherein each the geta member has a JISA hardness of 50 to 70.

19. The solar cell module according to claim 13, wherein each geta member is a contour-extrusion molded product.

20. The solar cell module according to claim 13, successively arranged on the roof body by fitting an end of the solar cell to another support table already fixed on the roof body, wherein a fitting-directional front end at the bottom of each geta member is formed into a smooth face.

21. The solar cell module according to claim 20, wherein a one-side adhesive tape whose surface is waxed is attached to the front end of each geta member and the remaining portion of the tape is attached to a support table.

22. The solar cell module according to claim 1, set on the roof body together with a roof tile, wherein the solar cell module is fixed to the light-receiving side of a substrate, which is made of a noncombustible material, wherein a tub structure is formed on the substrate at the same side as a tub portion of the roof tile, and the substrate is fixed on the roof body by using an area of the substrate in which no solar cell is fixed.

23. The solar cell module according to claim 22, wherein an eaves-side margin of the solar cell is secured by a plurality of clamps provided to the eaves-side end of the substrate.

24. The solar cell module according to claim 23, wherein a cover member extending over the width-directional whole area of the solar cell fixed by clamps is provided to a ridge-side margin of the solar cell along the ridge-side margin.

25. The solar cell module according to claim 22, wherein a plurality of clamps for fixing a connective portion constituting a leg portion of the eaves-side of the solar cell module are provided to the cover member and the module is connected onto the substrate through the cover member by engaging the connective portion with the clamps when stepwise setting another solar cell module adjacently to the ridge side.

26. The solar cell module according to claim 22, wherein an elastic sealing member having a proper thickness of 3 mm or more is attached to a portion located at the back of the solar cell or a margin and the inside of the back of said solar cell on the surface of the substrate facing the back of the solar cell to form a water stop structure at a gap between the solar cell and the substrate by the sealing member.

27. The solar cell module according to claim 22, wherein an opening for protruding a terminal box of the above solar cell to the backside of the module is formed on a portion of the substrate facing the terminal box and a tub member for covering the opening is removably set to the backside of the substrate.

28. The solar cell module according to claim 22, wherein a leg to be secured to a roof-tile stand tree on the roof body when fixing the solar cell module onto the roof body is provided to the substrate.

29. The solar cell module according to claim 22, wherein the adiabatic support member is constituted by a flat body portion face-fixed to the backside of the solar cell and a plurality of legs independent each other vertically set to the roof body from the body portion, a cable-holding groove is formed on one or more legs, and a cable-holding groove is also formed on a flat body portion on an extension line of the legs so as to communicate with the body portion.

30. The solar cell module according to claim 22, wherein an earth member for grounding to be electrically connected to a substrate of solar cell modules adjacently arranged at right and left and a screw for electrical connection are provided to the ridge-side end of the substrate.

31. The solar cell module according to any one of claims 1, 4, 13 or 22, wherein the solar cell is amorphous or hybrid.

32. A roof equipped with a power-generating function, wherein solar cell modules according to claim 4 holding an output-cable in a cable-holding groove are arranged along the outer face of a substrate sheet on the surface of the roof body.

33. A roof equipped with a power-generating function, wherein solar cell modules according to claim 13 disposing the geta members at the bottom of the support table are arranged on the roof body.

34. A roof equipped with a power-generating function, wherein solar cell modules according to claim 22 constituting the tub structure are arranged on the roof body together with roof tiles.

35. A roof equipped with a power-generating function constituted by arranging solar cell modules according to claim 1 along the surface of the roof body and introducing the power generated by these solar cell modules into the inside of a house from the apex of a roof through a cable, wherein a sleeve to be guided into the indoor side by passing through the cable is provided to the apex of the roof, and the sleeve is provided with a cable entrance opening at the surface side of the roof body on which the solar cell modules are arranged and a cable exit opening at the surface side or indoor side of another roof body adjacent by using the ridge portion of the roof as a boundary nearby a portion on which an insertion hole communicating with the indoor side adjacent to the former roof body is formed.

36. A solar cell module comprising a solar cell constituting a roof member, an output cable extended from the backside of the solar cell, and an adiabatic support member contacting the surface of a roof body fixed to the backside of the solar cell, wherein a plurality of drain ditches opening at the contact face of the adiabatic support member to the roof body is provided so as to communicate with a lateral side of the adiabatic support member, and wherein said drain ditches are formed so as to cross each other vertically and horizontally, wherein a part or the whole of a drain ditch is formed into a bottom-flared shape.

37. A solar cell module comprising a solar cell constituting a roof member, an output cable extended from the backside of the solar cell, and an adiabatic support member contacting the surface of a roof body fixed to the backside of the solar cell, wherein a plurality of drain ditches opening at the contact face of the adiabatic support member to the roof body is provided so as to communicate with a lateral side of the adiabatic support member, and wherein said drain ditches are formed so as to cross each other vertically and horizontally, wherein a constricted portion having a width approximately equal to the outside diameter of an output cable is formed on a part of a drain ditch along its longitudinal direction.

* * * * *